(12) United States Patent
Gopal

(10) Patent No.: US 11,200,054 B2
(45) Date of Patent: Dec. 14, 2021

(54) ATOMIC-COPY-XOR INSTRUCTION FOR REPLACING DATA IN A FIRST CACHELINE WITH DATA FROM A SECOND CACHELINE

(71) Applicant: Intel Corporation, Santa Clara, CA (US)

(72) Inventor: Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 16/019,302

(22) Filed: Jun. 26, 2018

(65) Prior Publication Data
US 2019/0050228 A1 Feb. 14, 2019

(51) Int. Cl.
*G06F 9/312* (2018.01)
*G06F 9/30* (2018.01)
*G06F 9/38* (2018.01)

(52) U.S. Cl.
CPC ...... *G06F 9/30021* (2013.01); *G06F 9/30029* (2013.01); *G06F 9/30043* (2013.01); *G06F 9/3877* (2013.01)

(58) Field of Classification Search
CPC ............ G06F 9/30021; G06F 9/30043; G06F 9/3877; G06F 11/1402; G06F 11/1438; G06F 11/1456; G06F 11/1458; G06F 9/30029; G06F 9/30032
See application file for complete search history.

(56) References Cited

U.S. PATENT DOCUMENTS

| | | | | |
|---|---|---|---|---|
| 6,636,950 | B1* | 10/2003 | Mithal | G06F 9/3004 711/117 |
| 9,880,762 | B1* | 1/2018 | Armangau | G06F 3/0619 |
| 2004/0177319 | A1* | 9/2004 | Horn | G06F 16/22 715/205 |
| 2019/0146916 | A1* | 5/2019 | Matsakis | G06F 12/084 711/130 |

OTHER PUBLICATIONS

Wikipedia, "Compare-and-swap", Jun. 19, 2018, 7 pages.*

\* cited by examiner

*Primary Examiner* — David J. Huisman
(74) *Attorney, Agent, or Firm* — Compass IP Law PC

(57) ABSTRACT

Apparatus and associated methods for implementing atomic instructions for copy-XOR of data. An atomic-copy-xor instruction is defined having a first operand comprising an address of a first cacheline and a second operand comprising an address of a second cacheline. The atomic-copy-xor instruction, which may be included in an instruction set architecture (ISA) of a processor, performs a bitwise XOR operation on copies of data retrieved from the first cacheline and second cacheline to generate an XOR result, and replaces the data in the first cacheline with a copy of data from the second cacheline when the XOR result is non-zero. In addition to implementation using a processor core, the atomic-copy-xor instruction may be implemented using various offloading schemes under which the processor core executing the atomic-copy-xor instruction offloads operations to other components in the processor or system in which the processor is implemented, including offloading operations to a last level cache (LLC) engine, a memory controller, or a DIMM controller.

29 Claims, 15 Drawing Sheets

FIG. 5A
Initial VM Launch

500a

| MRU ADDR | CKPT Pool Page | Modified |
|---|---|---|
| Page 1 | | 0 |
| Page 2 | | 0 |
| Page 3 | | 0 |
| Page 4 | | 0 |
| Page 5 | | 0 |
| Page 6 | | 0 |

FIG. 5B
Before 1st VM Checkpoint

500b

| MRU ADDR | CKPT Pool Page | Modified |
|---|---|---|
| Page 1 | Page B | 1 |
| Page 2 | Page A | 1 |
| Page 3 | Page H | 1 |
| Page 4 | | 0 |
| Page 5 | | 0 |
| Page 6 | | 0 |

FIG. 5C
After 1st VM Checkpoint

500c

| MRU ADDR | CKPT Pool Page | Modified |
|---|---|---|
| Page 1 | Page B | 0 |
| Page 2 | Page A | 0 |
| Page 3 | Page H | 0 |
| Page 4 | | 0 |
| Page 5 | | 0 |
| Page 6 | | 0 |

FIG. 5D
Before 2nd VM Checkpoint

500d

| MRU ADDR | CKPT Pool Page | Modified |
|---|---|---|
| Page 1 | Page B | 1 |
| Page 2 | Page A | 0 |
| Page 3 | Page H | 1 |
| Page 4 | Page C | 1 |
| Page 5 | New | 1 |
| Page 6 | | 0 |

FIG. 5E
After 2nd VM Checkpoint

500e

| MRU ADDR | CKPT Pool Page | Modified |
|---|---|---|
| Page 1 | Page B | 0 |
| Page 2 | | 0 |
| Page 3 | Page H | 0 |
| Page 4 | Page C | 0 |
| Page 5 | Page I | 0 |
| Page 6 | | 0 |

ATOMIC-COPY-XOR INSTRUCTION FOR REPLACING DATA IN A FIRST CACHELINE WITH DATA FROM A SECOND CACHELINE

BACKGROUND INFORMATION

In recent years, virtualization of computer systems has seen rapid growth, particularly in server deployments and data centers. Under a conventional approach, a server runs a single instance of an operating system directly on physical hardware resources, such as the CPU, RAM, storage devices (e.g., hard disk), network controllers, IO ports, etc. Under one virtualized approach using Virtual Machines (VMs), the physical hardware resources are employed to support corresponding instances of virtual resources, such that multiple VMs may run on the server's physical hardware resources, wherein each virtual machine includes its own CPU allocation, memory allocation, storage devices, network controllers, IO ports etc. Multiple instances of the same or different operating systems then run on the multiple VMs. Moreover, through use of a virtual machine manager (VMM) or "hypervisor," the virtual resources can be dynamically allocated while the server is running, enabling VM instances to be added, shut down, or repurposed without requiring the server to be shut down. This provides greater flexibility for server utilization, and better use of server processing resources, especially for multi-core processors and/or multi-processor servers.

The hypervisor under the foregoing approach is referred to as a "Type-2" hypervisor. A variant of this approach uses a "Type-1" or "bare metal" hypervisor under which the hypervisor runs directly on the hardware rather than running on a host operating system. As with Type-2 hypervisor, systems implementing Type-1 hypervisors can dynamically allocate virtual resources without requiring the server to be shut down.

Under another virtualization approach, container-based OS virtualization is used that employs virtualized "containers" without use of a VMM or hypervisor. Instead of hosting separate instances of operating systems on respective VMs, container-based OS virtualization shares a single OS kernel across multiple containers, with separate instances of system and software libraries for each container. As with VMs, there are also virtual resources allocated to each container.

Some virtualized environments are used for performing mission-critical tasks. To meet requirements for Reliability, Availability, and Serviceability (RAS), active VMs are used to run the mission critical tasks, while standby VMs are configured to take-over tasks in the event of a failure of an active VM. This is facilitated, in part, by performing periodic checkpoints under which the state of the active VM is copied to the standby VM. Since the VM is implemented in memory, the state of the VM is represented by the data in the memory pages that are allocated to and used by the active VM.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 4A-4E are diagrams depicting the state of various memory pages in a VM MRU pool and a VM checkpoint pool during various points in time connected with VM checkpoint operations, wherein FIG. 4A shows the memory state after an initial VM launch, FIG. 4B shows the memory state just prior to a first VM checkpoint, FIG. 4C shows the memory state immediately following the first VM checkpoint, FIG. 4D shows the memory state just prior to a second VM checkpoint, and FIG. 4E shows the memory state immediately following the second VM checkpoint;

FIGS. 5A-5E depict various states of a mapping table containing information that maps pages in the VM MRU pool to their associated pages in the VM checkpoint pool, along with a Modified flag, wherein FIG. 5A shows the table state after an initial VM launch, FIG. 5B shows the table state just prior to the first VM checkpoint, FIG. 5C shows the table state immediately following the first VM checkpoint, FIG. 5D shows the table state just prior to the second VM checkpoint, and FIG. 5E shows the table state immediately following the second VM checkpoint;

DETAILED DESCRIPTION

Figure 1:
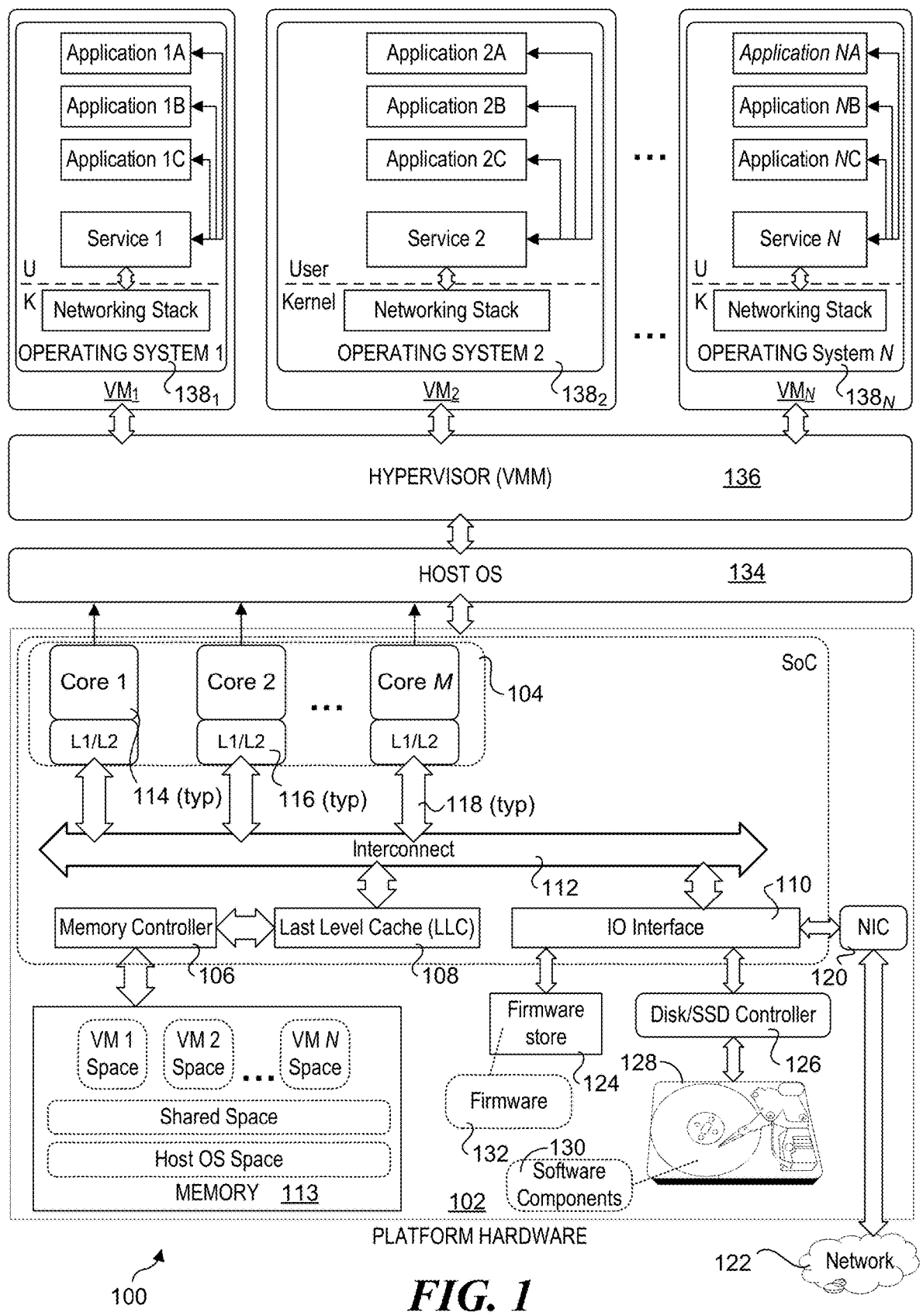
FIG. 1 is a schematic diagram illustrating an exemplary host platform configuration including platform hardware and various software-based components including Virtual Machines (VMs)

Embodiments of apparatus and associated methods for implementing atomic instructions for copy-XOR of data are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

For illustrative purposes, examples of atomic-copy-xor instructions are described herein in the context of their potential use in conjunction with performing VM check-pointing operations in a virtualized environment. It will be recognized by those having skill in the art that similar VM check-pointing schemes may be implemented in virtualized environments using various types of architectures (e.g., Type-1 hypervisor, Type-2 hypervisor, and container-based architectures) used for executing various types of software, and the illustrated use of software services is in no means limiting, but merely represents an exemplary use of the teachings and principles disclosed herein. It will further be recognized that the atomic-copy-xor instructions may be used in other contexts in addition to VM check-pointing, and the exemplary use of that atomic-copy-xor instructions for VM check-pointing is non-limiting.

FIG. 1 shows an exemplary host platform configuration 100 including platform hardware 102 and various software-based components including software service and application components. Platform hardware 102 includes a central processing unit (CPU) 104 coupled to a memory controller 106, a last level cache (LLC) 108 and an input/output (IO) interface 110 via an interconnect 112. In some embodiments, all or a portion of the foregoing components may be integrated on a System on a Chip (SoC). Memory controller 106 is configured to facilitate access to system memory 113, which will usually be separate from the SoC.

CPU 104 includes a core portion including M processor cores 116, each including a local level 1 (L1) and level 2 (L2) cache. Optionally, the L2 cache may be referred to as a "middle-level cache" (MLC). As illustrated, each processor core 116 has a respective connection 118 to interconnect 110 and operates independently from the other processor cores.

For simplicity, interconnect 110 is shown as a single double-ended arrow representing a single interconnect structure; however, in practice, interconnect 110 is illustrative of one or more interconnect structures within a processor or SoC, and may comprise a hierarchy of interconnect segments or domains employing separate protocols and including applicable bridges for interfacing between the interconnect segments/domains. For example, the portion of an interconnect hierarchy to which memory and processor cores are connected may comprise a coherent memory domain employing a first protocol, while interconnects at a lower level in the hierarchy will generally be used for 10 access and employ non-coherent domains. The interconnect structure on the processor or SoC may include any existing interconnect structure, such as buses and single or multi-lane serial point-to-point, ring, or mesh interconnect structures.

IO interface 110 is illustrative of various IO interfaces provided by platform hardware 102. Generally, IO interface 110 may be implemented as a discrete component (such as an ICH (IO controller hub) or the like), or it may be implemented on an SoC. Moreover, IO interface 110 may also be implemented as an IO hierarchy, such as a Peripheral Component Interconnect Express (PCIe™) IO hierarchy. IO interface 110 further facilitates communication between various IO resources and devices and other platform components. These include a Network Interface Controller (NIC) 120 that is configured to facilitate access to a network 122, and various other IO devices, which include a firmware store 124, a disk/SSD controller 126, and a disk drive 128. More generally, disk drive 128 is representative of various types of non-volatile storage devices, including both magnetic- and optical-based storage devices, as well as solid-state storage devices, such as solid state drives (SSDs) or Flash memory.

The multiple cores 114 of CPU 104 are employed to execute various software components 130, such as modules and applications, which are stored in one or more non-volatile storage devices, such as depicted by disk drive 128. Optionally, all or a portion of software components 130 may be stored on one or more storage devices (not shown) that are accessed via a network 122.

During boot up or run-time operations, various software components 130 and firmware 132 are loaded into system memory 113 and executed on cores 114 as processes comprising execution threads or the like. Depending on the particular processor or SoC architecture, a given "physical" core may be implemented as one or more logical cores, with processes being allocated to the various logical cores. For example, under the Intel® Hyperthreading™ architecture, each physical core is implemented as two logical cores.

Under a typical system boot for platform hardware 102, firmware 132 will be loaded and configured in system memory 113, followed by booting a host operating system (OS) 138. Subsequently, a hypervisor 136 (or VMM), which may generally comprise an application running on host OS 134, will be launched. Hypervisor 136 may then be employed to launch various virtual machines, $VM_{1-N}$, each of which will be configured to use various portions (i.e., address spaces) of system memory 113. In turn, each virtual machine $VM_{1-N}$ may be employed to host a respective operating system $138_{1-N}$.

During run-time operations, hypervisor 136 enables reconfiguration of various system resources, such as system memory 113, cores 114, and disk drive(s) 128 and other system components. Generally, the virtual machines provide abstractions (in combination with hypervisor 136) between their hosted operating system and the underlying platform hardware 102, enabling the hardware resources to be shared among $VMs_{1-N}$. From the viewpoint of each hosted operating system, that operating system "owns" the entire platform, and is unaware of the existence of other operating systems running on other virtual machines. In reality, each operating system merely has access to only the resources and/or resource portions allocated to it by hypervisor 136.

As further illustrated in FIG. 1, each operating system includes a kernel space and a user space, both of which are implemented as memory spaces in system memory 113. The kernel space is protected and used to run operating system kernel components, including a networking stack. Optionally, the networking stack will be in the user space. Meanwhile, an operating system's user space is used to run services and/or user applications, as depicted by Services 1, 2, and N, and Applications 1A-C, 2A-C, and NA-C.

Generally, Services 1, 2, and N are illustrative of various software services and/or applications that may run on virtual machines on platform hardware 102. For simplicity, each $VM_{1-N}$ is depicted as hosting a similar set of software applications; however, this is merely for illustrative purposes, as the VMs for a given platform may host similar applications, or may host different applications. Similarly, each $VM_{1-N}$ may host a service (as shown), may host multiple virtual services, or may host other types of non-service software.

A fundamental operation in VM check-pointing or migration is to manage the amount of data that has to be moved (since the entire VM image is massive). Rather than move the entire image data, initial VM images are created and then data corresponding to a delta between the images is transferred in connection with respective VM checkpoints. Under one approach, this is facilitated by keeping a pool of recently-accessed pages. Periodically, the VM is paused and then all the modified pages are copied/transferred to a second image (e.g., the VM image in memory for the backup/shadow VM or VM to be migrated to). A simple way to transfer the delta is to transmit all the modified pages, but this results in an IO problem (e.g., consumes too much bandwidth and too many IO cycles). Instead, a delta between a modified page and the unmodified version of the page is generated, and the delta is transmitted, usually in compressed form. If there is no earlier version of a page to perform the delta, then the entire page may be transferred. While the delta scheme is effective from IO reduction, it still incurs relatively high compute and/or memory-bandwidth cost.

Currently, the foregoing operations are performed via execution of software. This results in significant compute cost, large IO and memory bandwidth consumption, as well as cache pollution. Under embodiments described herein, machine (i.e., hardware-based) instructions are provided that perform copy-XOR operations that are executed via one or more hardware components, such as a processor core, integrated memory controller, or DIMM (dual in-line memory module) controller. In some embodiments, operations performed by the instruction are distributed across multiple components to offload some of the operations from the processor core. The embodiments provide for a substantial rejection in IO and memory bandwidth consumption, with little to no cache pollution.

By way of example, let delta-page=old-page^modified-page, where '^' represents a bit-wise XOR operation. Generally, since only a portion of a modified page (for many/most) pages will have been modified, the XOR delta-page will have mostly zeros, enabling it to be compressed down to a fraction of its original size by using a zero-compression scheme or the like. The old-page has to be updated as well, which is accomplished by copying the cachelines for the modified-page into corresponding cachelines for the old (unmodified) page. The following defines an atomic instruction of the form atomic-copy-xor ptr1, ptr2, zmm, where ptr1 is a pointer to the memory address of the old page, ptr2 is a pointer to the memory address of the modified page. The atomic instruction will do the following:

```
{
    zmm = ptr1[63:0] ^ ptr2[63:0]        // one cache-line from each of old page
                                          // and modified page
    If (non-zero zmm) ptr1[63:0] = ptr2[63:0]    // conditional copy new (modified)
                                                  // cacheline to old copy
}
```

For situations under which both the old page and modified page are in memory (and the cachelines in the memory page for the modified page are valid), this instruction can be sent to the memory controller that manages access to the memory pages (as defined by the src1 and src2 addresses), compute the XOR difference in the memory controller, and return the delta to the core (like the return of a load), while also conditionally doing the copy to update the older copy. Doing this in the memory controller avoids branch penalties that would result if the operations were performed in the CPU core. This approach also uses minimal memory bandwidth or CPU cycles. In some embodiments, software running on the CPU (core) can optionally zero compress the delta and send to a remote node, as described below.

Another extension is that if src1 and src2 corresponding to memory cachelines that are accessed via the same memory controller, the operation can be pushed to the DIMM controller, which will return the delta and perform the conditional copy to update the older copy. Thus no data from either page traverses the memory channels, and it is just the delta that has to be sent over to the CPU core. As a third extension, similar operations may be offloaded to an LLC engine, as described below.

Embodiments of the instructions may be implemented under various system architecture, including but not limited to the compute platform architecture shown in FIG. 1. Under some implementations and/or situations, at least some of the modified memory pages will reside in system memory and contain valid data. However, in other situations the valid copy of the data for the modified copy will be in a level of cache, and the copy of the data in memory will not match the modified copy. Thus, it will be necessary to retrieve the modified copy of the data from a cache in the systems cache hierarchy.

Figure 2:
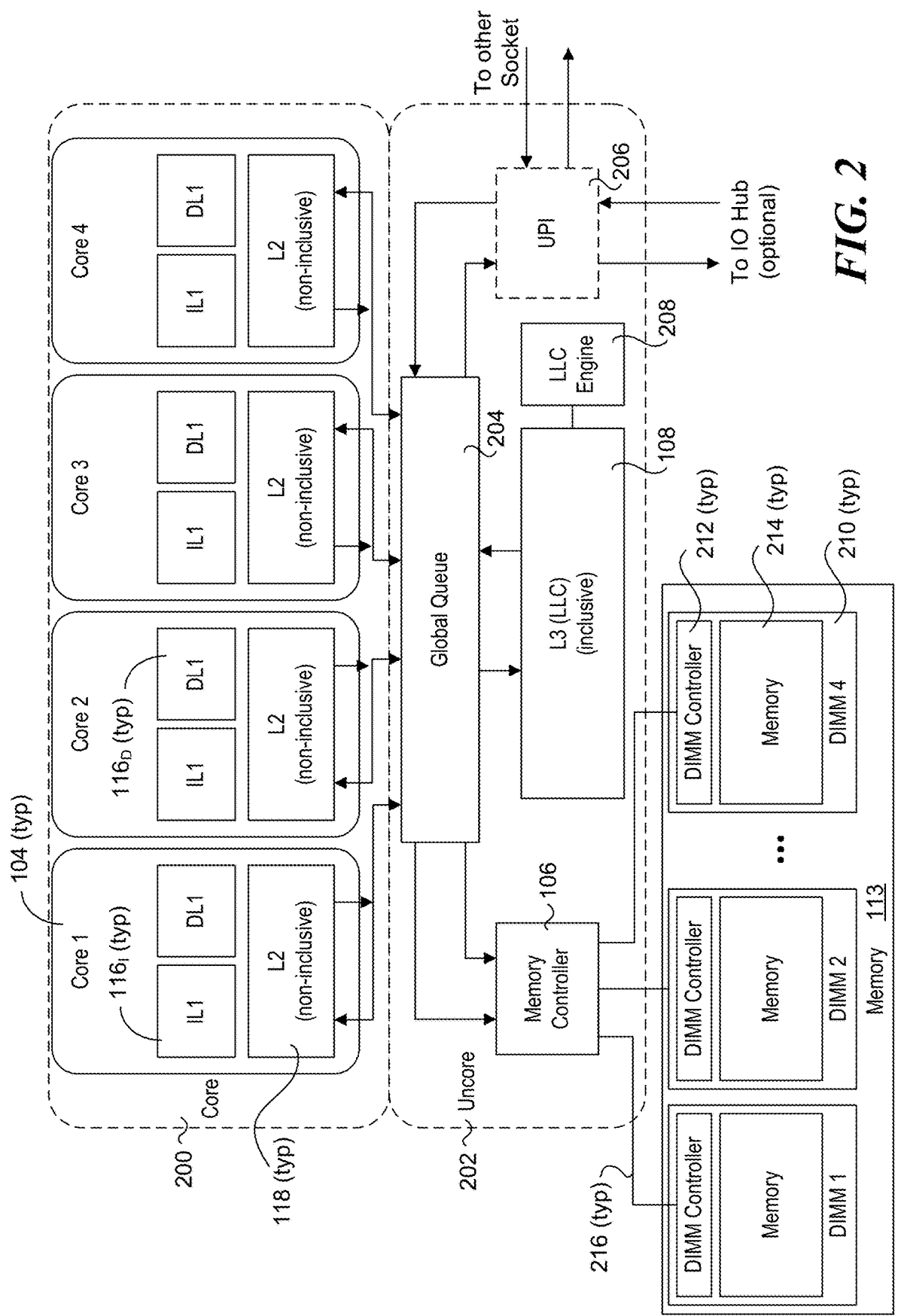
FIG. 2 is a schematic diagram illustrating an abstracted view of a memory coherency architecture employed by the platform shown in FIG. 3, according to one embodiment.
Figure 3:
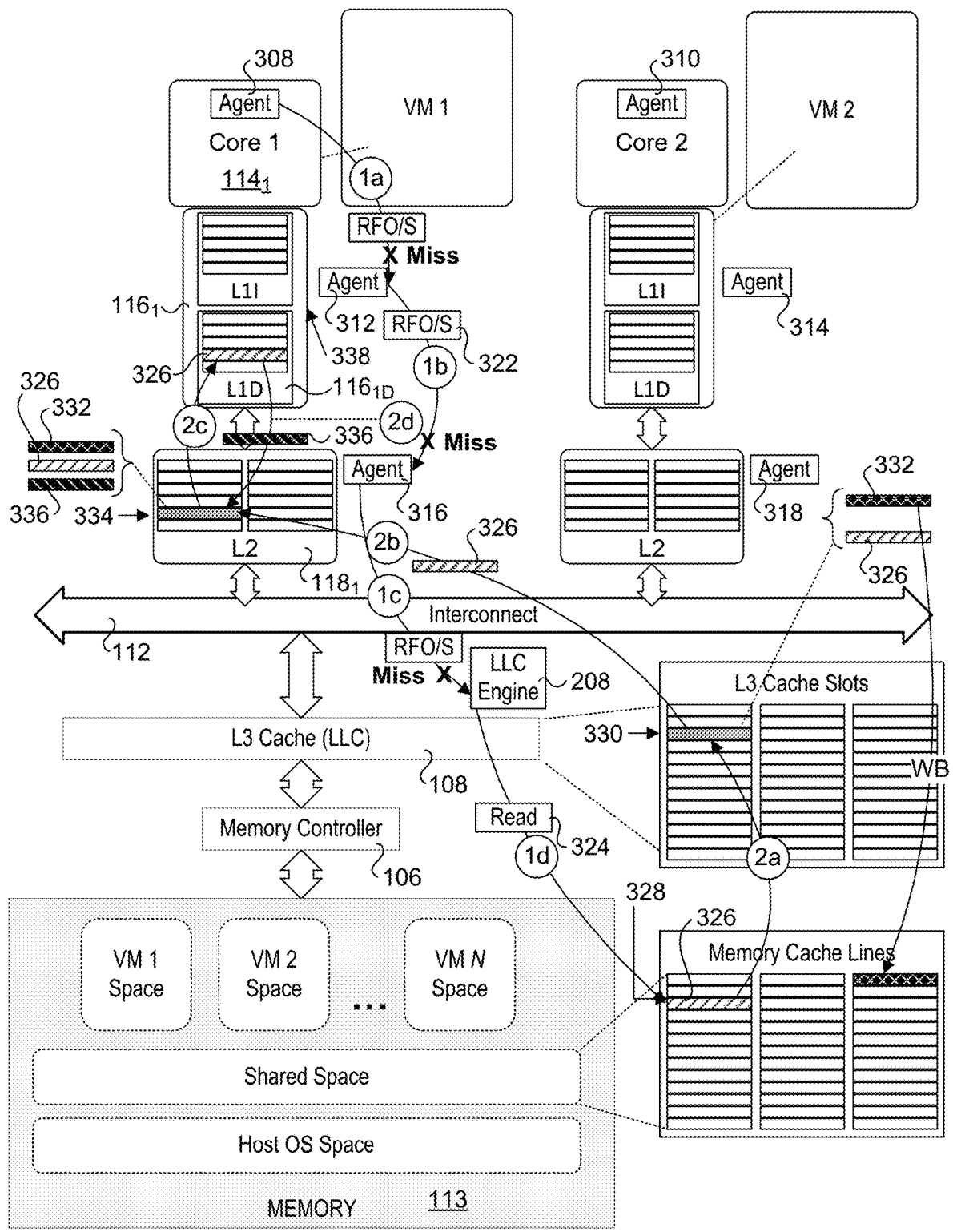
FIG. 3 is a schematic diagram illustrating access of a cacheline by a VM or application that is not currently stored in any cache level and is accessed from system memory, under a conventional approach.

FIG. 2 shows an abstracted view of a memory coherency architecture employed by some embodiments, such as illustrated in further detail in FIG. 3. Under this and similar architectures, such as employed by many Intel® processors, the L1 and L2 caches are part of a coherent memory domain under which memory coherency is managed (in part) by coherency mechanisms in the processor core 200. Each core 104 includes an L1 instruction (IL1) cache 116l, an L2 data cache (DL1) 116, and an L2 cache 118. L2 caches 118 are depicted as non-inclusive, meaning they do not include copies of any cachelines in the L1 instruction and data caches for their respective cores. As an option, L2 may be inclusive of L1, or may be partially inclusive of L1. In addition, L3 may be non-inclusive of L2. As yet another option, L1 and L2 may be replaced by a cache occupying a single level in the cache hierarchy.

Meanwhile, the LLC (or L3 cache) is considered part of the "uncore" 202, wherein memory coherency is extended through coherency agents, as shown in FIG. 3 below. As shown, uncore 202 includes memory controller 106 coupled to external memory 113 and a global queue 204. Global queue 204 also is coupled to an L3 cache 108, and an optional Universal Path Interconnect® (UPI) interface 206. L3 cache 108 (which functions as the LLC in this architecture) is inclusive, meaning that it includes is a copy of each cacheline in the L1 and L2 caches. In other embodiments, the LLC may be non-inclusive or partially inclusive. As further illustrated, an LLC engine 208 is used to manage the operation of L3 cache 108, which includes operating as an agent for the L3 cache.

As is well known, as you get further away from a core, the size of the cache levels increase, but so does the latency incurred in accessing cachelines in the caches. The L1 caches are the smallest (e.g., 32-64 KiloBytes (KB)), with L2 caches being somewhat larger (e.g., 256-640 KB), and LLCs being larger than the typical L2 cache by an order of magnitude or so (e.g., 8-16 MB). Of course, the size of these caches is dwarfed by the size of system memory (on the order of GigaBytes (GB) in today's compute platforms). Generally, the size of a cacheline at a given level in a memory hierarchy is consistent across the memory hierarchy, and for simplicity and historical references, lines of memory in system memory are also referred to as cachelines even though they are not actually in a cache. It is further noted that the size of global queue 204 is quite small, as it is designed to only momentarily buffer cachelines that are being transferred between the various caches, memory controller 106, and UPI interface 206.

FIG. 2 further shows details of system memory 113, which is depicted as including four DIMMs 210, each including a DIMM controller 212 and memory 214. In the illustrated embodiment, each DIMM controller 212 is connected to a respective memory channel 216 of memory controller 106. Under an alternative configuration (not shown), some DIMMs support access via multiple memory channels.

FIG. 3 depicts various operations that are performed to enable a processor core to modify data that is stored in system memory 113 under one embodiment of a conventional cache coherency protocol. This is facilitated by multiple cache agents that are used to exchange messages and transfer data in accordance with the cache coherency protocol used for the memory domain. The agents include core agents 308 and 310, L1 cache agents 312 and 314, L2 cache agents 316 and 318, and LLC engine 208, which operates as an agent for the LLC in addition to controlling/managing other LLC operations.

Data in system memory is stored in memory blocks (also referred to by convention as cachelines as discussed above), and each memory block has an associated address, such as a 64-bit address for today's 64-bit processors. From the perspective of software running on the processor cores, which includes VM 1 on core 1 and VM 2 on core 2, a given chunk of data (data object) is located at a location in system memory beginning with a certain memory address, and the data is accessed through the application's host OS. Generally, the memory address is actually a virtual memory address, and through some software and hardware mechanisms, such virtual addresses are mapped to physical addresses behind the scenes. Additionally, the application is agnostic to whether all or a portion of the chunk of data is in a cache. On an abstract level, the application will ask the operating system to fetch the data (typically via address pointers), and the OS and hardware will return the requested data to the application. Thus, the access sequence will get translated by the OS as a request for one or more blocks of memory beginning at some memory address which ends up getting translated (as necessary) to a physical address for one or more requested cachelines.

Generally, the access sequence would begin with a core (e.g., core 114i) sending out a Read for Ownership (RFO) message and first "snooping" (i.e., checking) its local L1 and L2 caches to see if the requested cacheline is currently present in either of those caches. For example, suppose that VM 1 desires to access a cacheline so its data can be modified, and thus the RFO is used rather than a Read request. The presence of a requested cacheline in a cache is referred to as a "hit," while the absence is referred to as a "miss." This is done using well-known snooping techniques, and the determination of a hit or miss for information maintained by each cache identifying the addresses of the cachelines that are currently present in that cache. As discussed above, the L2 cache is non-inclusive, making the L1 and L2 caches exclusive, meaning the same cacheline will not be present in both of the L1 and L2 caches for a given core.

Under an exemplary access sequence, core agent 308 sends an RFO message with snoop (RFO/S) 322 during an operation 1a to L1 cache agent 312, which results in a miss. During an operations 1b, L1 cache agent 312 the forwards RFO/snoop message 322 to L2 cache agent 316, resulting in another miss.

In addition to snooping a core's local L1 and L2 caches, the core will also snoop L3 cache 108. If the processor employs an architecture under which the L3 cache is inclusive, meaning that a cacheline that exists in L1 or L2 for any core also exists in the L3, the core knows the only valid copy of the cacheline is in system memory if the L3 snoop results in a miss. If the L3 cache is not inclusive, additional snoops of the L1 and L2 caches for the other cores may be performed. In the example of FIG. 3, L2 agent 316 forwards RFO/snoop message 322 to LLC engine 208, which also results in a miss. Since L3 is inclusive and the result was a miss, LLC engine 208 does not forward RFO/snoop message 322 to cache agents for other cores, as a miss for L3 means the only valid copy of the cacheline is in system memory 113.

In response to detecting that the requested cacheline is not present in L3 cache 108, LLC engine sends a Read request 324 to memory controller 106 to retrieve the cacheline from system memory 113, as depicted by an access operation 1d that accesses a cacheline 326, which is stored at a memory address 328. As depicted by a copy operation 2a, the Read request results in cacheline 326 being copied into a cacheline slot 330 in L3 cache 108. Presuming that L3 is full, this results in eviction of a cacheline 332 that currently occupies slot 330. Generally, the selection of the cacheline to evict (and thus determination of which slot in the cache data will be evicted from and written to) will be based on one or more cache eviction algorithms that are well-known in the art. If cacheline 332 is in a modified state, cacheline 332 will be written back to memory 113 (known as a cache write-back) prior to eviction, as shown. As further shown, there was a copy of cacheline 332 in a slot 334 in L2 cache $118_1$, which frees this slot. Cacheline 326 is also copied to slot 334 during an operation 2b.

Next, cacheline 326 is to be written to L1 data cache 1161D. However, this cache is full, requiring an eviction of one of its cachelines, as depicted by an eviction of a cacheline 336 occupying a slot 338. This evicted cacheline is then written to slot 334, effectively swapping cachelines 326 and 336, as depicted by operations 2c and 2d. At this point, cacheline 326 may be accessed by core $114_1$.

The foregoing corresponds to the operations required to modify a single cacheline when there are no copies of the cacheline in any of the cache levels. Similar, albeit different operations are performed for a read access request to read a cacheline when there are no copies of the cacheline in any of the cache levels. When these operations are performed in connection with conventional approaches used for VM check-pointing, they result in a massive amount of cache operations with corresponding overhead and cache pollution.

FIGS. 4A-4E illustrate an example sequence of memory page and cacheline states in connection with VM check-pointing operations, under one embodiment. Under this approach, a range of memory (or ranges of memory) are allocated to a VM for use by the VM. The memory range(s) is partitioned into memory pages, as depicted by VM memory pages 402. Different sizes of memory pages may be used, such as 4K pages, for example.

The memory pages are further partitioned into two pools, including a VM most recently used (MRU) pool 404 and a VM checkpoint pool 406. The state of the memory pages in the VM checkpoint pool 406 correspond to the memory state for the VM as of the most recent checkpoint, and these pages are not modified between checkpoints; these pages are also referred to herein as "old pages." Rather than modify the pages in VM checkpoint pool 406, when a page is to be modified between checkpoints, the modifications to the page are made to a copy of the page in VM MRU pool 404.

From the perspective of the VM operating system, it can only "see" the memory pages in VM checkpoint pool 406 (noting that the virtual addresses for these memory pages may be mapped to different virtual addresses by the VMM or hypervisor). Thus, although the VM is allocated all of the memory pages in VM memory pages 402, the operating system can only access the portion of memory pages in VM checkpoint pool 406. For example, in one embodiment 70% of VM memory pages 402 may be allocated to VM checkpoint pool 406, with the remaining 30% of the pages allocated to VM MRU pool 404. It is noted that the sizes of the VM checkpoint pool and VM MRU pool may be dynamically changed during runtime operations. In one respect, VM checkpoint pool and the operating system pool are one in the same. However, for convenience, this portion of the VM memory pages are referred to and illustrated herein as a VM checkpoint pool.

VM MRU pool 404 operates as a type of cache within system memory, noting this is a virtual cache that is different from the L1, L2, and L3/LLC caches. As pages in VM checkpoint pool are accessed for modification (e.g., data in one or more cachelines for the memory page will be written to, resulting in modification of those cachelines), the modified copy of the memory page is stored in VM MRU pool 404 at a memory address corresponding to Pages 1-6. In one embodiment, mapping information is maintained by the VMM/hypervisor (or an associated component) that tracks which pages are currently in the VM MRU pool and maps the addresses of the pages in the VM checkpoint pool to their respective addresses in VM MRU pool. It is further noted that since VM MRU pool operates as a virtual cache, a modified copy of a given VM checkpoint pool page may be located anywhere within the VM MRU pool.

Returning to FIGS. 4A-4E, an initial VM launch state 400a is depicted in FIG. 4A. At this state, all of the copies of the memory pages that are initially used by the VM will be in VM checkpoint pool 406, as depicted by the pages 408 labeled 'A'-'H'. Pages 'I' and 'J' have been allocated, but are currently not in use. Similarly, pages 410 in VM MRU pool 404 have been allocated, but none of these pages are currently in use. For illustrative purposes, all of the cachelines 408 in pages 'A'-'H' are depicted in white; this doesn't mean they do not contain any data, but rather represent a current state of the data in the cachelines.

As discussed above, mapping information is maintained to identify what pages from the VM checkpoint pool occupy which addresses in the VM MRU pool, along with information indicating whether the page has been modified or not since the last checkpoint. An example of the states of a mapping table 500, depicted as states 500a, 500b, 500c, 500d, and 500e, are shown in FIGS. 5A-5E, respectively. As shown in FIG. 5A, under mapping table state 500a corresponding to the initial VM launch, all of the slots for the checkpoint pool page (CKPT Pool Page) entries are blank, and the corresponding Modified state bits are set to '0', indicating the pages have not been modified.

Figure 4A:
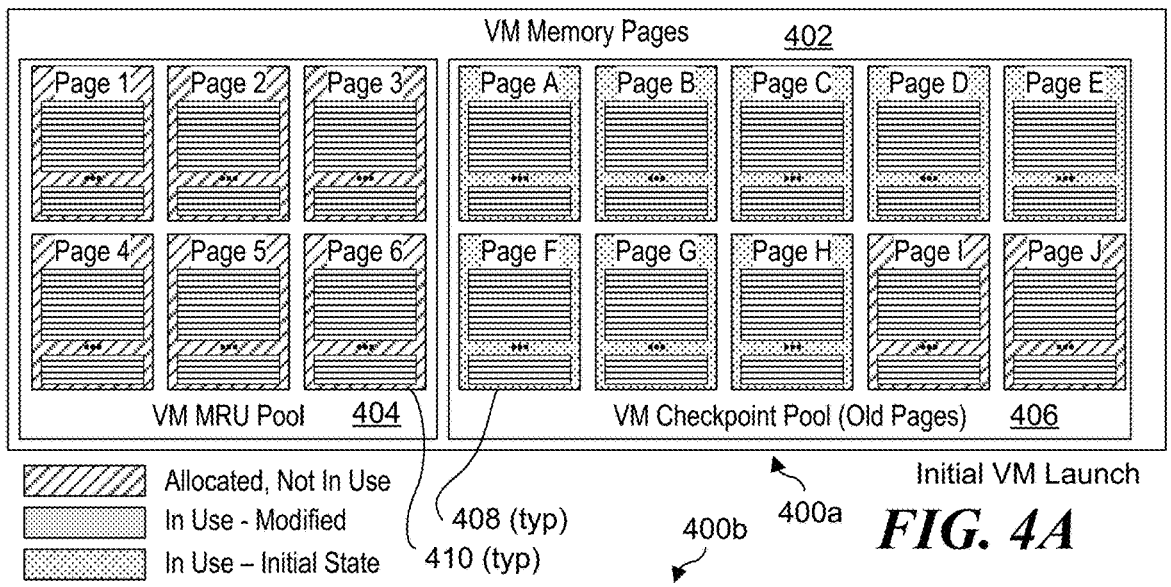
Figure 4B:
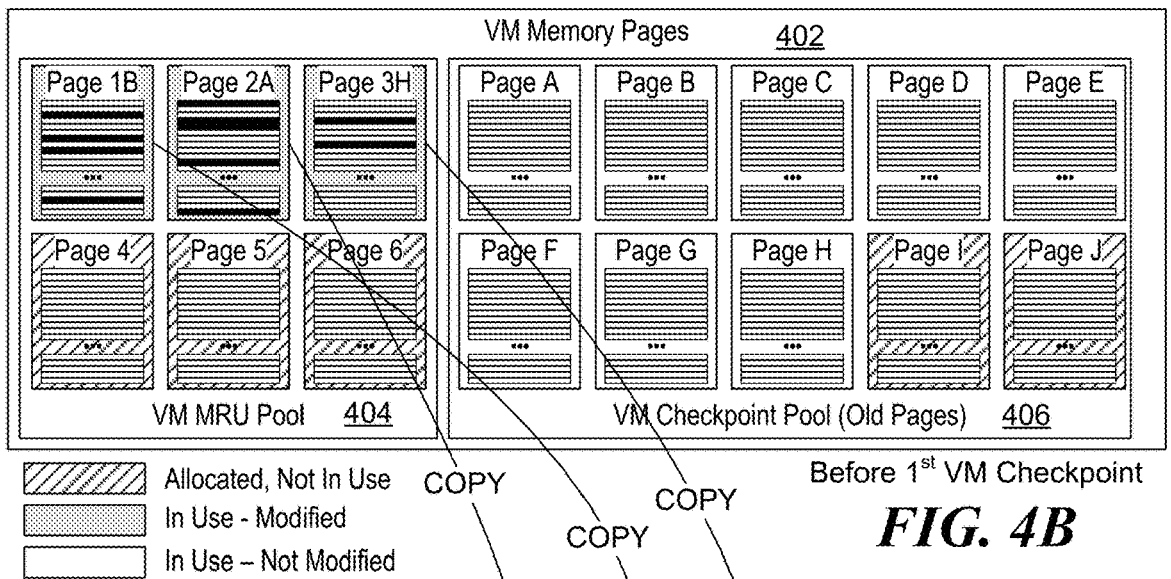

FIG. 4B illustrates a VM memory pages 402 state 400b just prior to the first checkpoint, while FIG. 5B depicts the corresponding state 500b of mapping table 500. As shown, during the period from the initial VM launch (state 400a) and state 400b, modifications have been made to each of pages 'A', 'B', and 'H'. However, rather than modify the copies of pages 'A', 'B', and 'H' in VM checkpoint pool 406, the modified copies of the pages are made in VM MRU pool 404. As used herein, a copy of a given page that is currently cached in VM MRU pool 404 is labeled with the corresponding page label for the page location concatenated with the page's label in VM checkpoint pool 406. For example, the copy of page 'B' at the address corresponding to Page 1 is labeled '1B', the copy of page 'A' at the address corresponding to Page 2, is labeled '2A', etc. As shown in state 500b, the entries for the first three MRU pool Page slots 1-3 are Pages B, A, H, respectively, with the Modified flag bit set to '1' indicating the each of Pages B, A, and H has been modified since the last checkpoint (or in this case since the initial VM state 400a.

Figure 4C:
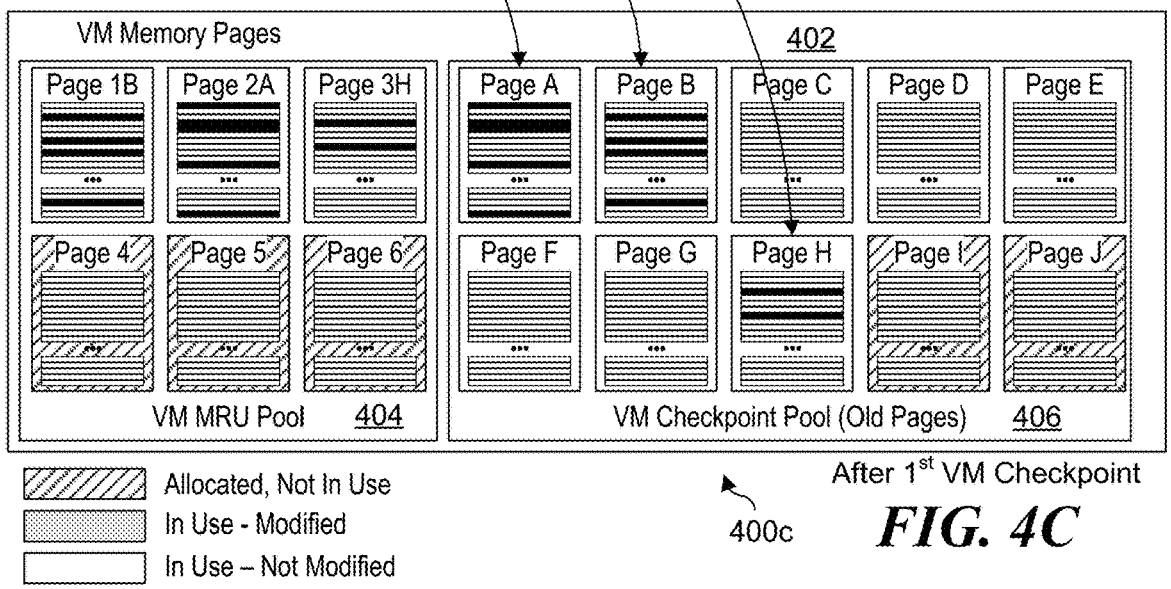

FIGS. 4C and 5C illustrate the changes to the VM memory pages 402 state and mapping table 500 state immediately after the first VM checkpoint. During the first VM check-pointing operations, cachelines in Pages 1B, 2A, and 3H of VM MRU pool 404 that have been modified are copied (written) to corresponding cachelines in Pages B, A, and H of VM checkpoint pool 406. Details of how this process is implemented are discussed below. The effective result is that the copies of all pages that have been modified since the last checkpoint are updated to reflect the current memory state of the VM. As shown at states 400c and 500c, in connection with performing a checkpoint, the Modified flag (bit) is reset to '0'.

In association with the checkpoint operations illustrated in FIGS. 4A-4E and 5A-5C, delta data representing the changes to the memory state of the VM relative to the most recent checkpoint is sent to a node running (or configured to run) the backup VM and/or sent to some non-volatile storage device used to store a copy of the VM memory pages. Further details of this process are described below.

Figure 4D:
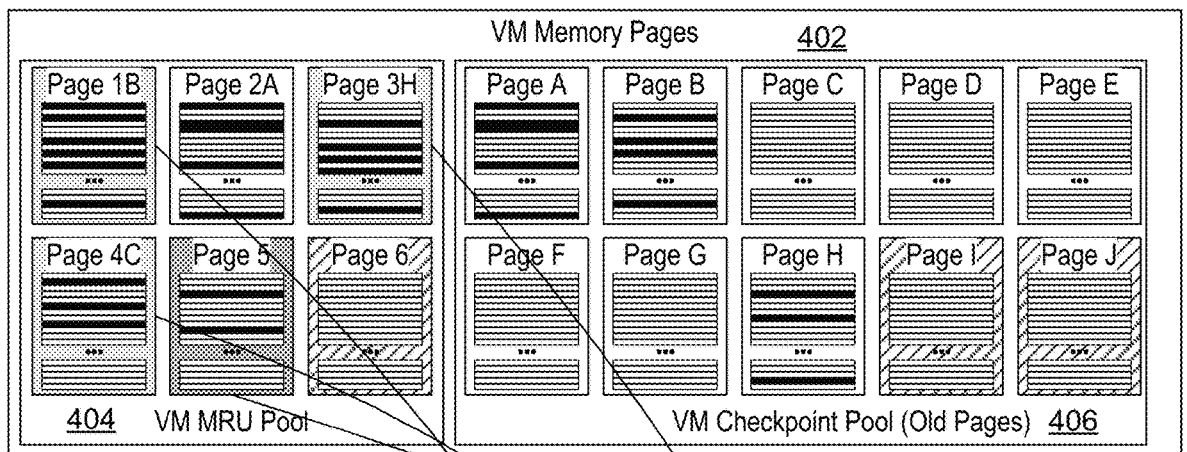

As shown in FIGS. 4D and 5D in states 400d and 500d, during the period between the first and second checkpoints, Page C has been added to VM MRU pool 404 at Page slot 4, while a new page has been added to Page slot 5. As further shown, each of Pages B (1B) and H (3H) have been modified since the first checkpoint, while Page A (2A) has not been modified. Accordingly during the second check-pointing operations, cachelines in Pages B, C, and H in VM checkpoint pool 406 will be updated based on the corresponding cachelines in Pages 1B, 3H, and 4C, as depicted in states 400e and 500e of FIGS. 4E and 5E. When a new page is added, the entirety of the new page is copied into one of the unused pages, as illustrated by copying the new page in Page slot 5 to Page I in VM checkpoint pool 406.

Figure 4E:
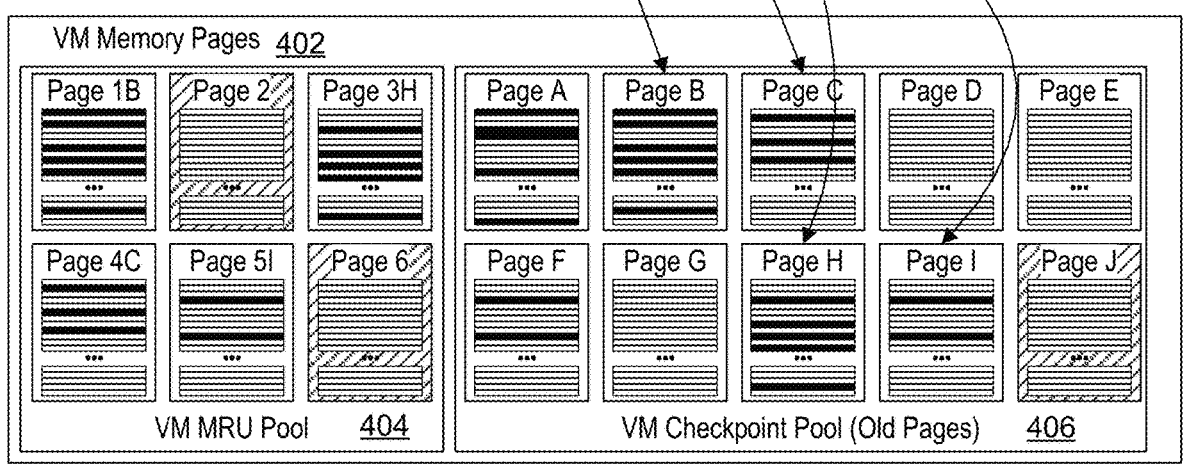

FIGS. 4E and 5E further depict Page 2A being evicted (in effect) from the VM MRU pool. Various well-known page eviction policies may be used to remove pages from the VM MRU pool, such as least recently used (LRU), for example. When a page is evicted, its corresponding slot is freed and made available for use by any of the pages in the VM checkpoint pool that are not already in the VM MRU pool.

Atomic Copy-XOR Instruction Definition

In accordance with one embodiment, an atomic copy-xor instruction is defined in LISTING 1, as follows:

LISTING 1

```
1.  // zmm is a 512-bit (or 64 byte) register
2.  // src1 is an address to the older copy
3.  // src2 is an address to the newest copy
4.
5.  atomic-copy-xor (zmm dst, m64 src1, m64 src2){
6.      zmm tmp1, tmp2
7.      tmp1 = load-64-bytes(src1)
8.      tmp2 = load-64-bytes(src2)
9.      dst = tmp1 ^ tmp2    // bit-wise-xor
10.     If (dst == 0) ZF = 1    // set the Zero-flag
11.     Else {
12.         ZF = 0;
13.         Store-64-bytes(src1, tmp2)// write tmp2 to
14.                                   // address at src1
15.     }
16. }
```

Software Processing Loop for a Page

LISTING 2 to shows pseudocode for a software processing loop for a page. The page size is 4 KB consisting of 64 cachelines (64 Bytes each).

LISTING 2

```
1.  For(i=0; i<64; i++){
2.      zdst = atomic-copy-xor(old-page-base + 64*i,
3.                             new-page-base + 64*i);
4.      tmp = zcompress(zdst); // optional
5.      Store(tmp) to outbuffer;
```

LISTING 2 -continued

```
6.      outbuffer += zcompress-size(zdst)
7.  }
```

Figure 6A:
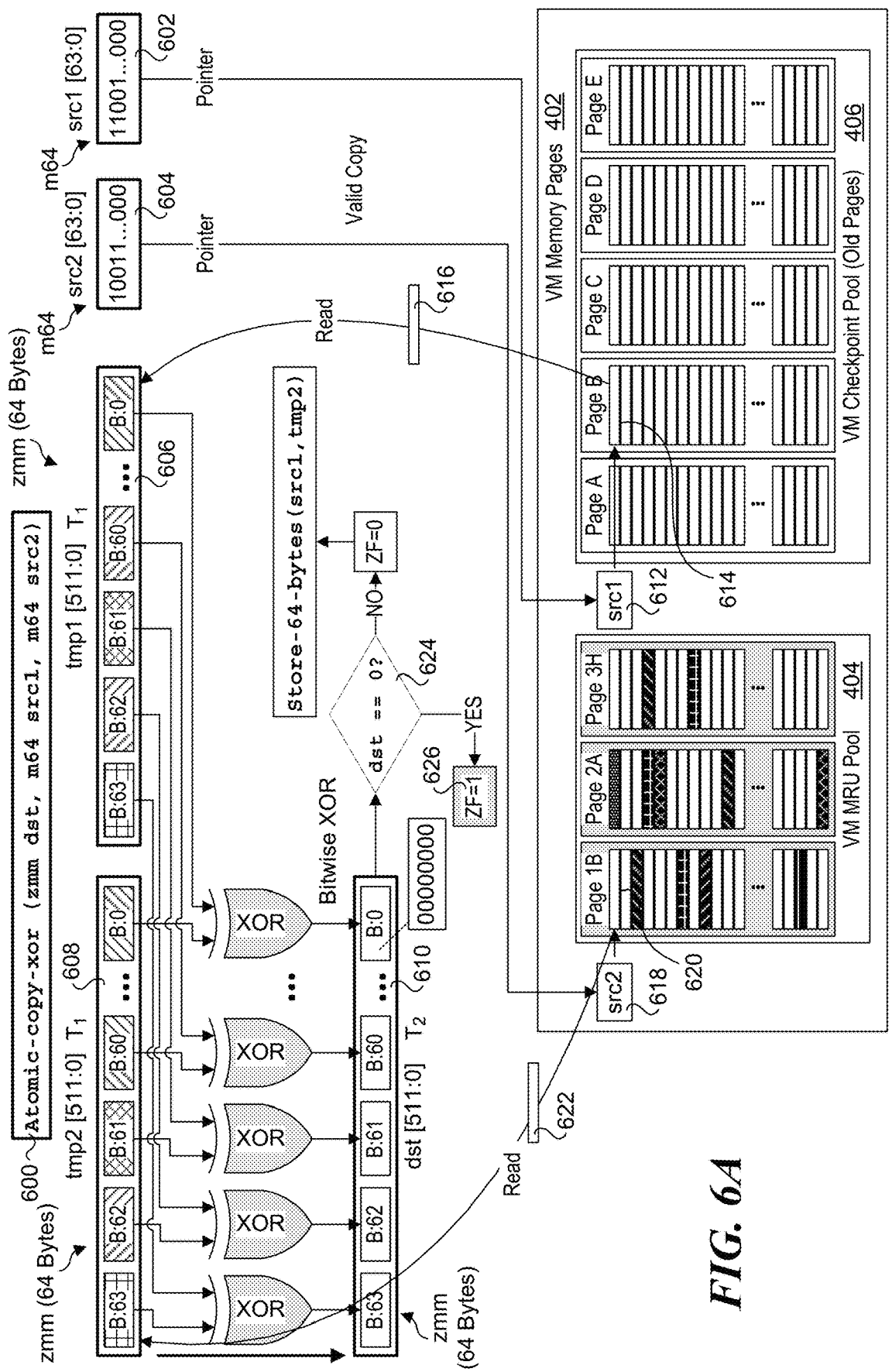
FIG. 6A is a combination schematic and process flow diagram illustrating an implementation of an atomic-copy-xor instruction under which there is no modification between the first cacheline for a page in the VM checkpoint and the first cacheline for the modified copy of the page in the VM MRU pool, according to one embodiment.
Figure 6B:
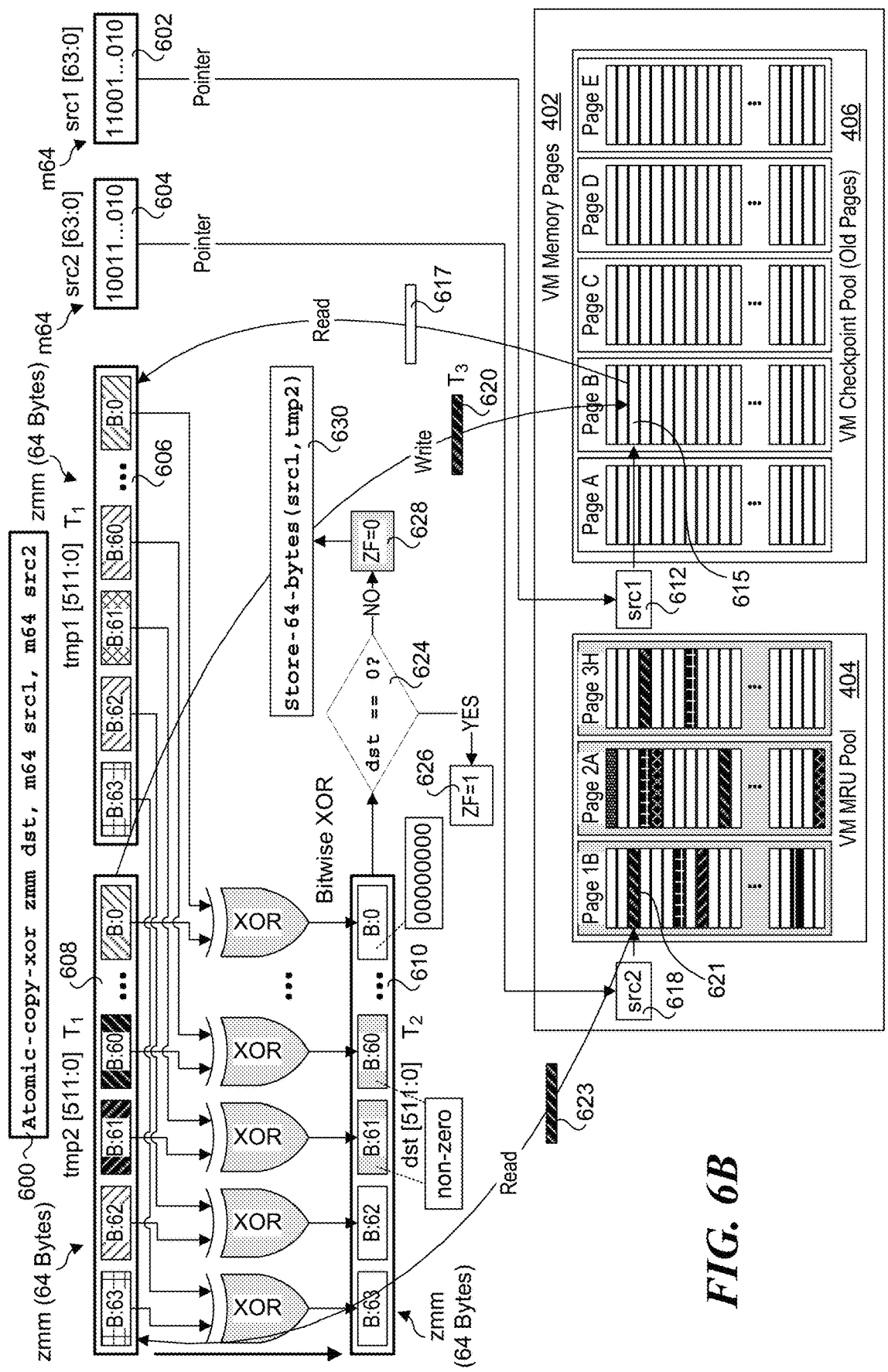
FIG. 6B shows operations performed during execution of the atomic-copy-xor instruction for a third cacheline for a page in the VM checkpoint and the third cacheline for the modified copy of the page in the VM MRU pool under which the third cacheline in the modified copy has been modified since the last checkpoint, according to one embodiment.

FIGS. 6A and 6B illustrate exemplary use of an atomic-copy-xor instruction 600 for processing the first and third cachelines for Page B. In one embodiment, the operations of LISTING 2 are performed for each of the pages in VM MRU pool 404 that are flagged as modified. In the examples in FIGS. 4A-4E, Page B is the first page that is added to the VM MRU pool, as depicted by Page 1B, and so the processing for the VM MRU pool would begin with Page 1B under which the delta is between the cacheline data in Page 1B and Page B.

As shown in FIGS. 6A and 6B, various registers are used to store associated argument values and results. This include a pair of 64-bit memory registers 602 and 604 used to respectively store the src1 and src2 memory addresses, and three 64 Byte (512-bit) registers 606, 608, and 610 used for storing the tmp1 and tmp2 cacheline values respectively associated with the cachelines at the src1 and scr2 memory addresses, and the dst (destination) value that is derived by performing a bitwise XOR on the tmp1 and tmp2 cacheline values.

With reference to FIG. 6A, src1 address 612 points to a cacheline 614 corresponding to the first cacheline for Page B, the "old" page in VM checkpoint pool 406, in which data 616 is stored. Meanwhile, scr2 address 618 points to a cacheline 620 which is the first cacheline for Page 1B, the modified page in VM MRU pool 404 in which data 622 is stored. In association with atomic-copy-xor instruction 600, data 616 for cacheline 614 pointed to by the src1 address is loaded into tmp1 register 606, while data 622 for cacheline 620 pointed to by the scr2 address is loaded into tmp2 register 608. For illustrative purposes, these are shown as occurring at a time $T_1$. However, since two cachelines having non-consecutive addresses cannot be read (and subsequently returned) at the same time, time $T_1$ is illustrative of the timeframe associate with the first phase of operations, as opposed to a specific point in time.

tmp1 and tmp2 registers 606 and 608 show further details of the cacheline data 616 and 622. For illustrative purposes, selected Bytes among the 64 Bytes are illustrated using various cross-hatch patterns to represent different Byte values. As illustrated, the Bytes for each of cacheline data 616 and 622 are exactly the same. In accordance with the example of FIGS. 4A-4E described above, this is the result when a given cacheline for a page that is in the VM MRU pool 404 has not changed since the last checkpoint. Since both the 64 Byte values in tmp1 and tmp2 registers 606 and 608 are the same, the result of the bitwise XOR operation will be a '0' for each bit, as depicted by the solid white background for Bytes B:63, B;62, B:61, B:60 . . . B:0 in dst register 610. The bitwise XOR result is depicted at a time T2, corresponding to a second phase of the operations associated with execution of atomic-copy-xor instruction 600. As depicted by a decision block 624, a determination is to whether the dst value is 0. In accordance with the IF statement in line 10 of LISTING 1, if dst is 0, the answer to decision block 624 is YES, and the zero flag (ZF) is set to 1 in a block 626, indicating the value for dst is 0, i.e., no change from the previous checkpoint. ZF=1 is then returned as the result of execution of atomic-copy-xor instruction 600. Optionally, when ZF=1, a dst value 64 Bytes of '0000' may also be returned.

When the bitwise XOR for the second cacheline for Pages 1B and 1B is calculated during the next loop of LISTING 2 (i.e., i=1), the result will also be dst=0 with ZF=1. However, when i=2, the result of the bitwise XOR is non-zero, since the third cacheline of Page 1B has been modified (relative to Page B) since the last checkpoint.

Details of the processing of the third cacheline of Page 1B are depicted in FIG. 6B. This time the scr1 address 612 in src1 register 602 points to cacheline 615 (the third cacheline of Page B), which has a value 617, with further details of the cacheline value depicted in tmp1 register 606. Meanwhile, the scr2 address 618 in src2 register 604 points to cacheline 621 (the third cacheline of Page 1B), which has a value 623, with further details of the cacheline value depicted in tmp2 register 608. As depicted by the crosshatch patterns for Bytes B:63, B:62, B:61, B:60, . . . B:0 in tmp1 register 606 and tmp2 register 608, the Byte values for Bytes B:61 and B:60 have been modified in Page 1B. As a result, the bitwise XOR operation will result in a non-zero dst value. Thus, when the determination of whether dst is 0 in decision block 624 is evaluated, the answer is NO, resulting in the zero flag being cleared (ZF=0) in a block 628, and the cacheline in tmp2 register 608 being stored in (and overwriting the data in) the cacheline pointed to by the src1 address (cacheline 615), as depicted in a block 630 and corresponding to lines 11-14 of LISTING 1. The result is the modified copy of the cacheline is written to the corresponding cacheline for the page in the VM checkpoint pool, thus updating the value of this cacheline to reflect its current state.

The operations illustrated in FIGS. 6A and 6B are repeated for all of the cachelines for each of the pages that have been modified since the last VM checkpoint, in a manner similar to that illustrated in FIGS. 4A-4E and discussed above. The net result is that only the modified cachelines are written to pages in the VM checkpoint pool associated with the modified pages in the VM MRU pools. In addition, the return result for each execution of the atomic-copy-xor instruction 600, which comprises bitwise XOR dst value for the modified cachelines, is added to an output buffer, with optional zero compression (or other compression) before it is added. The output buffer, which contains data representing the delta between the previous VM checkpoint and the current memory state of the VM, can then be sent to the node associated with the backup VM (also referred to as a shadow VM) or to the non-volatile storage device.

Offloading Copy-XOR Operations to a DIMM Controller

While it is possible to implement an atomic-copy-xor instruction entirely in a processor core (recognizing that portions of the operations resulting from execution of such an instruction are performed by various components in addition to the core, such as cache agents, the LLC engine, and memory controller, as applicable), this approach still results in relatively high IO bandwidth and cache pollution. Rather, the more interesting implementation schemes offload a significant portion of the operations, including cacheline access operations and XORing operations, to another component in the processor or system, such as an LLC engine, memory controller, or a DIMM controller.

Figure 7A:
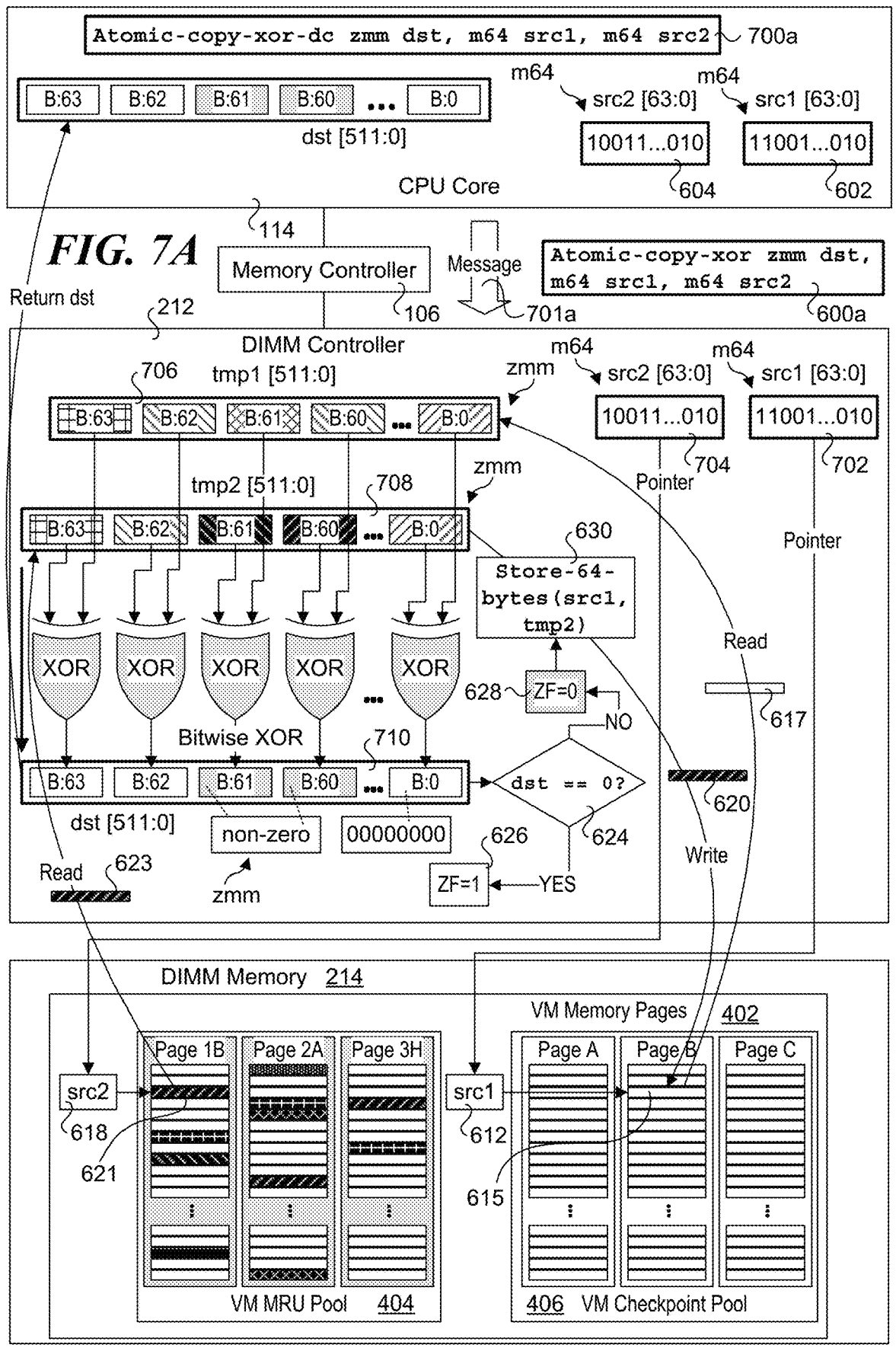
FIG. 7A is a combination schematic and process flow diagram illustrating a first offloading scheme under which copy-XOR operations are offloaded to a DIMM controller, according to one embodiment.
Figure 8A:
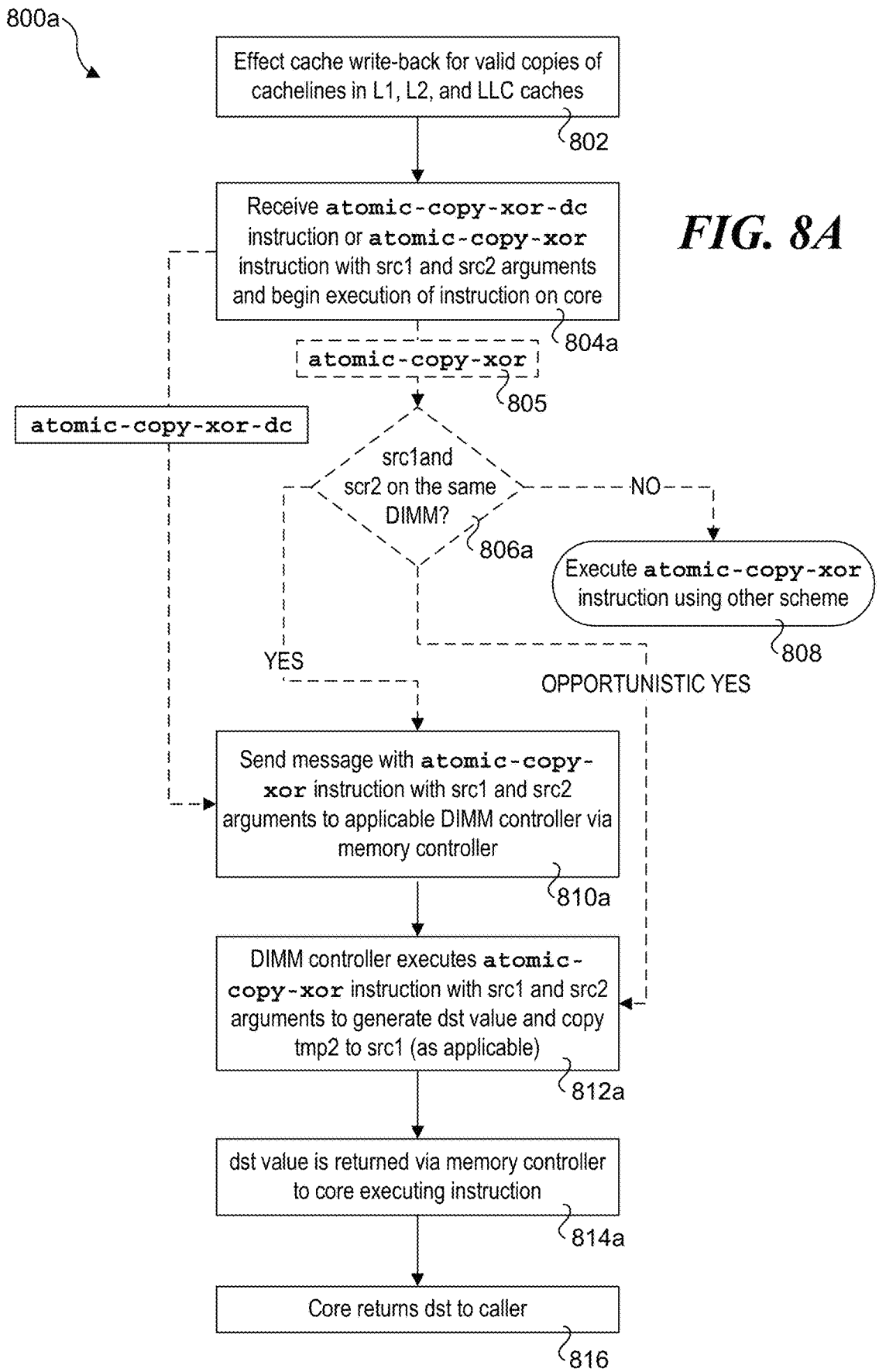
FIG. 8A is a flowchart illustrating operations and logic associated with the DIMM controller offload scheme of FIG. 7A, according to one embodiment.

One embodiment of an atomic-copy-xor-dc instruction 700a implementation scheme that offloads the bulk of the work to a DIMM controller is shown in FIG. 7A. The components involved in this embodiment include a CPU core 114, a memory controller 106, a DIMM controller 212, and DIMM memory 214 in which the VM memory pages are stored. In one embodiment, corresponding operations and logic performed in connection with use and execution of atomic-copy-xor-dc instruction 700a are shown in a flowchart 800a of FIG. 8A.

In order to offload the processing operations to a DIMM controller, two requirements must be met. First, the cacheline corresponding to scr2 (the potentially updated cacheline that is to be XOR'ed with the older cacheline) must be reflect the current state of the cacheline (referred to as a valid copy of the cachelines). Second, both of the cachelines corresponding to the scr1 and src2 addresses must be stored on the same DIMM.

As described above, VM check-pointing operations are performed on a page-by-page basis under which pages modified since the last checkpoint are processed. This generally will involve a large number of pages, with the collective size of these pages being much larger than the L3 or LLC cache, which in turn is substantially larger than the L1 and L2 caches. Thus, the most efficient way to ensure that only valid cachelines are operated on, a means is implemented in a block 802 of flowchart 800a to effect cache write-back for valid copies of cachelines in the L1, L2, and L3 or LLC caches. Depending on the particular cache coherency scheme and cache architecture, this may be effected using one or more schemes. As discussed above, when a cacheline is evicted from the LLC, its data is written back to system memory. In addition, only cachelines with "clean" data may be written back to system memory.

Under one non-limiting example of a cache coherency scheme, the state of a cacheline in a cache may be one of (M)odified, (E)xclusive, (S)hared, or (I)nvalid. This scheme is commonly referred to as the "MESI" cache coherency scheme. A cacheline having an (E)xclusive or (S)hared state is "clean," meaning it hasn't been modified relative to the copy of the cacheline in system memory. If the cacheline state is (M)odified, or (I)nvalid, the copy of the cacheline in the cache is "dirty," meaning it does not match the copy of the cacheline in system memory. Clean copies of the cachelines do not need to be written back to system memory, while (M)odified copies need to be written back to maintain memory coherency. (I)nvalid cachelines, which by definition contain invalid data, are not written back.

Under one approach, the caches are "flushed," which will cause all (Modified) copies of cachelines being written back to system memory, with the result that all memory pages will contain valid data and thus reflect the current state of the VM memory. While flushing caches will produce the desired result of block 802, it is preferably to leave valid copies of cachelines in the caches such that when the VM is resumed (following the checkpoint), the data it was previously operating on is still cached. Thus, under another approach, the (M)odified cachelines are written back to system memory without flushing the caches.

The second criteria is that src1 and scr2 correspond to cachelines in the same DIMM. This can either be determined in advance, such as by the software calling the atomic-copy-xor-dc instruction, or it can be determined by the core (and/or other processor components) at the time of execution. With respect to an advance determination by software, the VMM/hypervisor (or an associated software component) maintains mappings between virtual memory addresses used by the software and physical memory addresses used by the hardware. The physical memory addresses are associated with the memory on the DIMMs. Accordingly, the software caller may selectively call the atomic-copy-xor-dc instruction knowing in advance that the scr1 and scr2 addresses are mapped to cachelines on the same DIMM. This will result in the core executing a current instruction thread for the software receiving an atomic-copy-xor-dc instruction, as shown in a block 804a of flowchart 800a.

Under an alternative scheme, the core itself will receive an atomic-copy-xor instruction (without the -dc) and the core and/or other components will dynamically determine at the time of execution whether the copy-XOR operations can be offloaded to a DIMM controller. As depicted by a decision block 806a, in one embodiment the core will determine whether scr1 and scr2 map to cachelines on the same DIMM. This determination can be made using various mechanisms, such as sending a message to the memory controller or identifying the DIMM and/or memory channel for scr1 and scr2 via a lookup table or the like maintained in hardware on the processor. As depicted by an atomic-copy-xor message 805, in one embodiment a message with an atomic-copy-xor instruction with scr1 and scr2 arguments is opportunistically sent to the a memory controller to have the copy-XOR operations performed by an applicable DIMM controller if scr1 and scr2 are on the same DIMM. If scr1 and scr2 are not on the same DIMM, the logic proceeds to an exit block 808 under which the atomic-copy-xor instruction is executed using another scheme that does not involve offloading the XOR bitwise operation to a DIMM controller.

If either an atomic-copy-xor-dc instruction was received in block 804a or the answer to decision block 806a is YES and the opportunistic message approach is not used, the logic proceeds to a block 810a in which a message with an atomic-copy-xor instruction with scr1 and scr2 arguments is sent to the applicable DIMM controller via the memory controller. If the system supports multiple memory controllers, then the message will be sent to the memory controller to which the applicable DIMM controller is connected. Returning to FIG. 7A, the operation of block 810a is depicted as a message 701a including an atomic-copy-xor instruction 600a with scr1 and scr2 arguments. If the opportunistic message approach is used, a similar message to message 701 will be sent to the memory controller, with the memory controller determining where scr1 and scr2 are on the same DIMM.

In a block 812a the DIMM controller executes the atomic-copy-xor instruction 600a with scr1 and scr2 arguments to generate a dst value using the bitwise XOR operation on the cachelines corresponding to the scr1 and scr2 addresses. As shown in FIG. 7A, DIMM controller 212 includes similar registers to those shown in FIGS. 6A and 6B, including a pair of 64-bit registers 702 and 704 for storing the scr1 and scr2 addresses, and three 64-Byte registers 706, 708, and 710 for respectively storing the tmp1, tmp2, and dst values.

As depicted in a block 814a, the dst value obtained through the bitwise XOR operation is returned to the core executing the original atomic-copy-xor-dc or the original atomic-copy-xor instruction (as applicable) via the memory controller. In a block 816, the core then returns dst to the caller. For example, in the context of line 2 of LISTING 2, dst would be returned as zdst.

Offloading Copy-XOR Operations to a Memory Controller

Figure 7B:
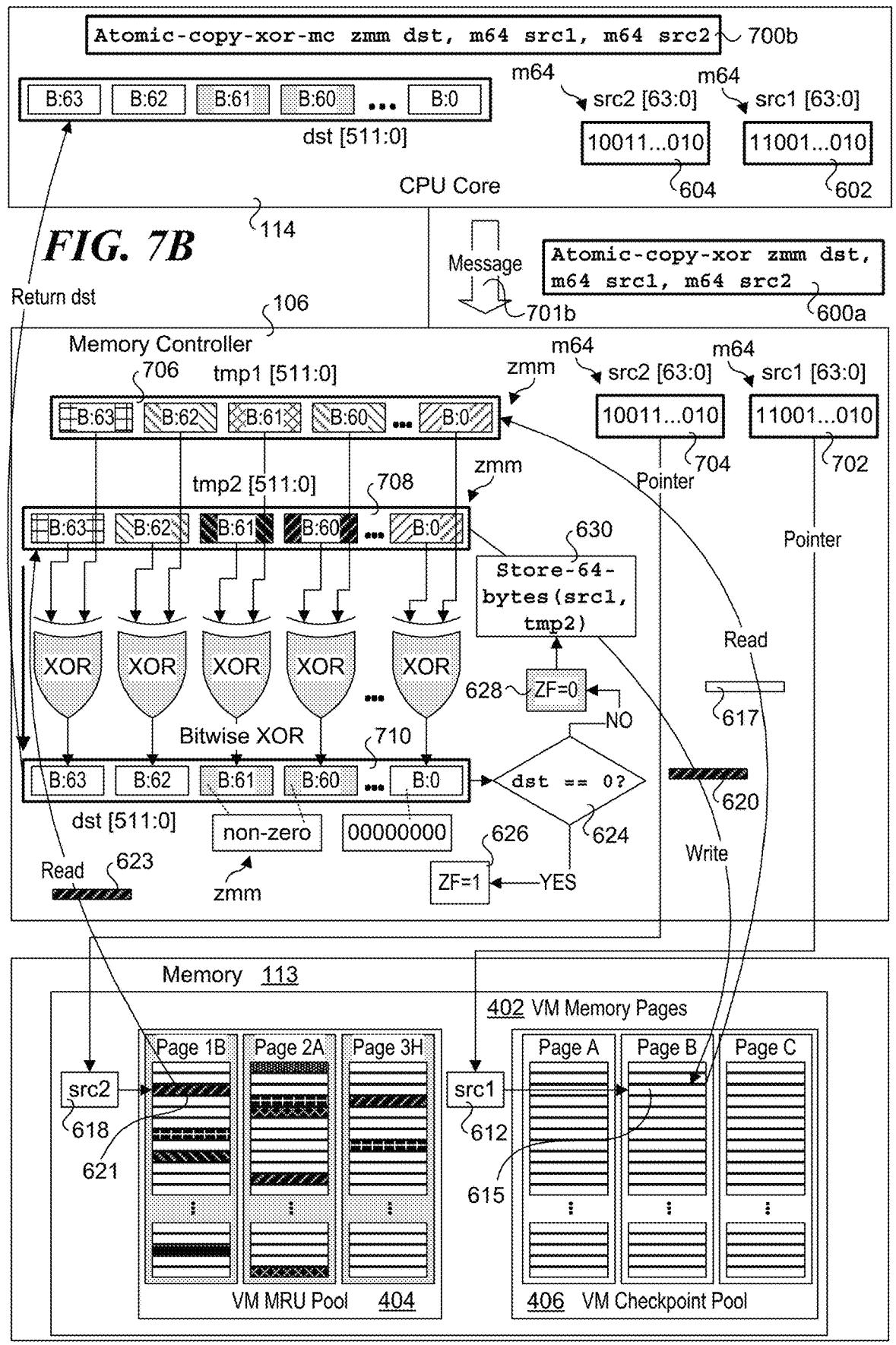
FIG. 7B is a combination schematic and process flow diagram illustrating a second offloading scheme under which copy-XOR operations are offloaded to a memory controller, according to one embodiment.
Figure 8B:
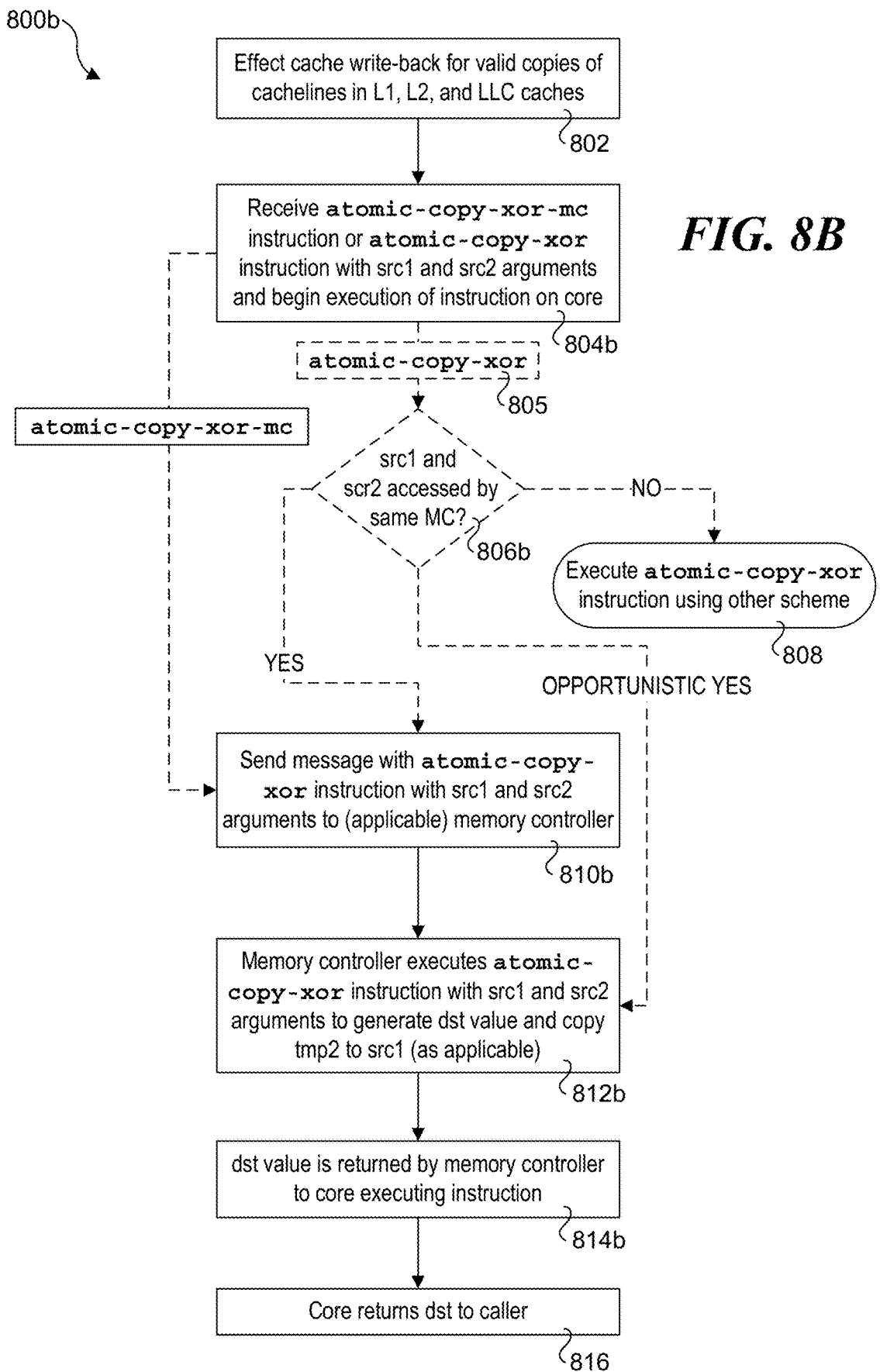
FIG. 8B is a flowchart illustrating operations and logic associated with the memory controller offload scheme of FIG. 7B, according to one embodiment.

As an alternative to offloading the copy-XOR operations to a DIMM controller, in one embodiment the copy-XOR operations are offloaded to a memory controller, as illustrated in FIG. 7B and a flowchart 800b of FIG. 8B. As depicted by like-numbered components and blocks in FIGS. 7A, 7B, and 8A, 8B, the operation and configuration of this embodiment is similar to that shown in FIGS. 7A and 8A, except for an atomic-copy-xor-mc instruction 700b is depicted in FIG. 7A and a block 804b, and the message containing the atomic-copy-xor instruction 600a is sent to an (applicable) memory controller 106 in a block 810b rather than DIMM controller 214 using a message 701b. In addition, in a decision block 806b a determination is made to whether src1 and scr2 can be accessed from the same memory controller (MC) in a decision block 806a. As before, message 701b can be sent opportunistically to the memory controller when a determination to whether scr1 and src2 can be accessed via the same memory controller is determined at the time the core executes an atomic-copy-xor instruction. The memory controller then executes the atomic-copy-xor instruction with src1 and src2 arguments to generate a dst value in a block 812b, which is returned to the core in a block 814b.

Offloading Copy-XOR Operations to the LLC Engine

Figure 7C:
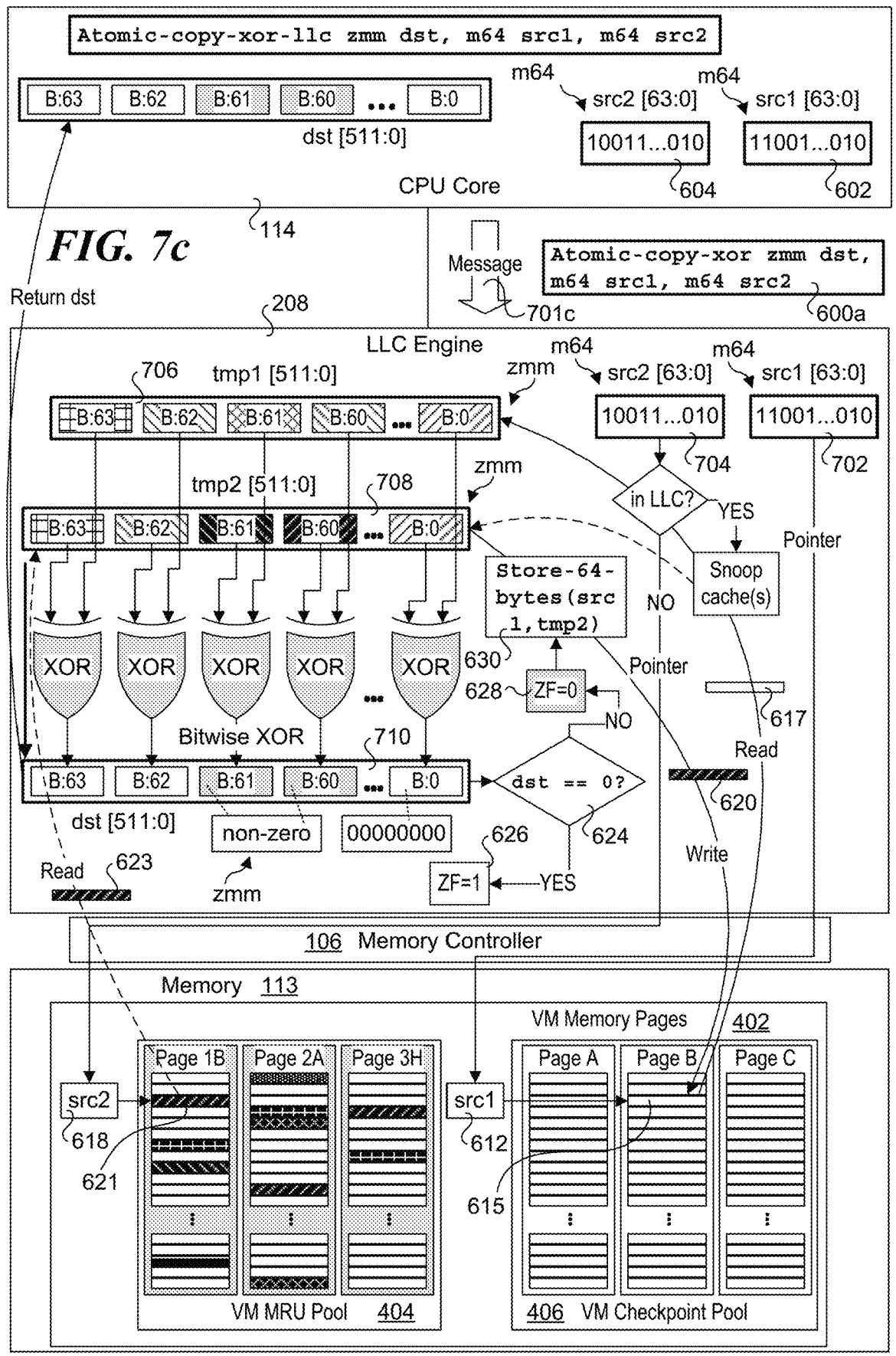
FIG. 7C is a combination schematic and process flow diagram illustrating a third offloading scheme under which copy-XOR operations are offloaded to an LLC engine, according to one embodiment.

As yet another alternative, the copy-XOR operations may be offloaded to an LLC engine. As shown in FIG. 7C, the configuration of the illustrated embodiment is similar to those of FIGS. 7A and 7B, except the registers and operations associated with execution of the atomic-copy-xor instruction 600a are implemented in LLC engine 208. However, as illustrated in a flowchart 900 of FIG. 9, the operations are somewhat different.

Figure 9:
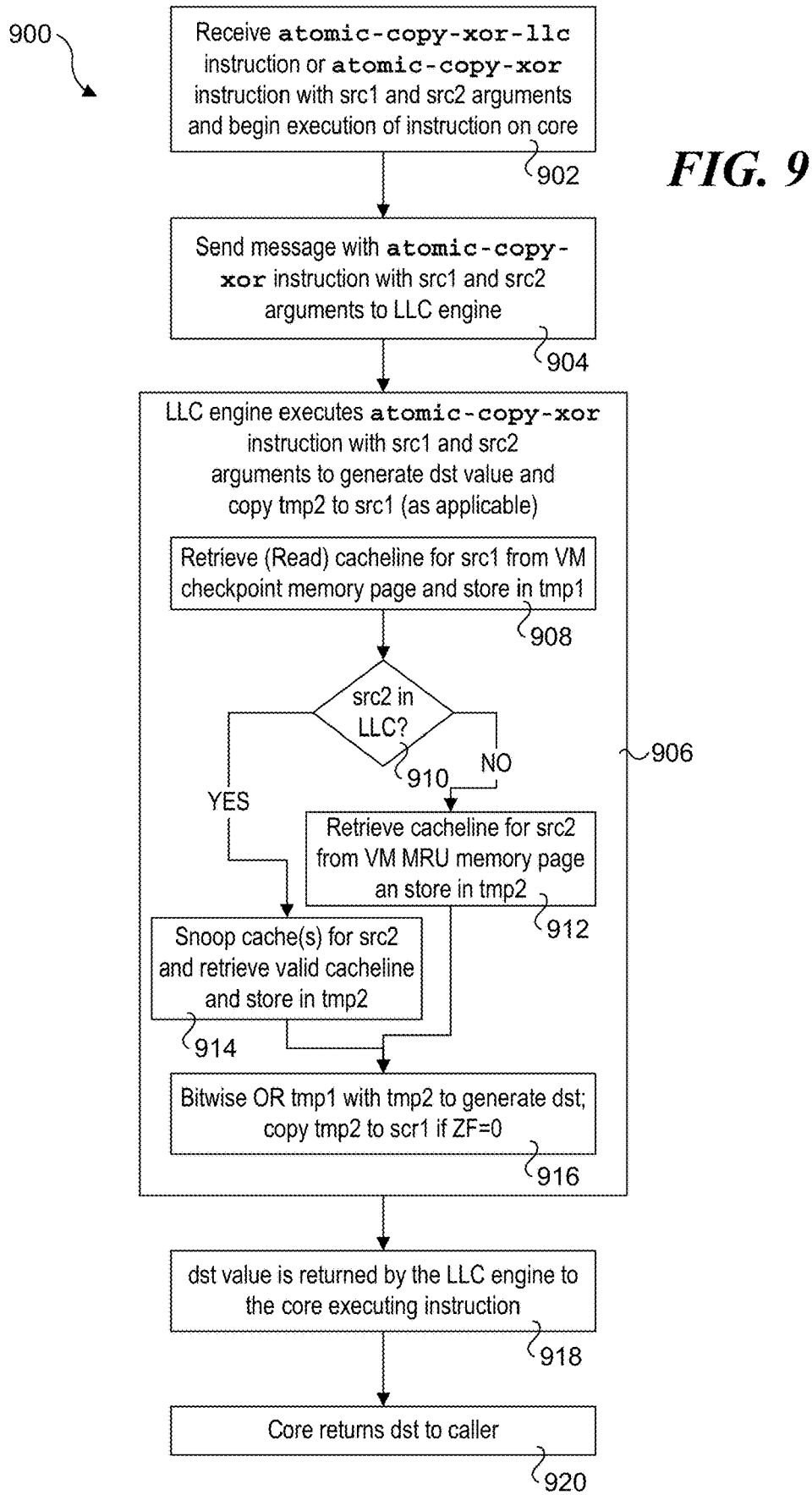
FIG. 9 is a flowchart illustrating operations and logic associated with the LLC engine offload scheme of FIG. 7C, according to one embodiment.

A primary difference between the LLC engine embodiment of FIGS. 7C and 9 and the DIMM controller and memory controller offload embodiments discussed above is that the LLC engine embodiment doesn't need to have the state of the cachelines in the modified memory pages in the VM MRU pool be valid prior to execution of the atomic-copy-xor instruction. Rather, the LLC engine can use the assistance of the various cache agents in the processor to access any (M)odified copies of cachelines from their current location using snooping operation similar to shown in FIG. 3 and discussed above, except the snoops would originate from the LLC engine rather than a processor core.

With reference to FIG. 9, in a block 902 the core receives an atomic-copy-xor-llc instruction or atomic-copy-xor instruction with src1 and src2 arguments and begin execution of instruction on the core. Depending on the implementation, the processor/core may implement an LLC engine offload by default, and thus the -llc addendum to the instruction will not be needed. Under some embodiments, use of the atomic-copy-xor-llc instruction will explicitly instruct the core to offload the copy-XOR operations to the LLC engine.

In a block 904, the core sends an atomic-copy-xor instruction 600a with src1 and src2 arguments to the LLC engine, as shown by message 701c in FIG. 7C. In a block 906, the LLC engine executes the atomic-copy-xor instruction with src1 and src2 arguments to generate the tmp1^tmp2 dst value and copies tmp2 to src1 (as applicable). These operations are depicted in further detail in blocks 908, 912, 914, and 916, and decision block 910.

In block 908, the cacheline for src1 is retrieved from the VM checkpoint memory page using a Read request with src1 as the cacheline address in a similar manner to that described and illustrated above. In decision block 910 a determination is made to whether src2 is in the LLC. As discussed above, in one embodiment the LLC is inclusive of L1 and L2, and thus if a cacheline address is not in the LLC there are no copies of the cacheline in any of the cache levels. This would result in the answer to decision block 910 being NO, and the logic would proceed to access the cacheline pointed to by src2 from an applicable VM MRU memory page and store a copy of the cacheline in tmp2. If there is a match for src2 in the LLC, the answer to decision block 910 is YES, resulting in the logic proceeding to block 914 in which snooping is performed to locate a valid copy of the cacheline.

The snooping will search for a (M)odified copy of the cacheline among the L1 and L2 caches (if it exists). While an inclusive LLC (or L3 cache) will include a copy of all of the cachelines in the L1 and L2 caches, the state of a given cacheline in the LLC/L3 cache may differ from the state of the valid cacheline if the cacheline has been (M)odified. A (M)odified cacheline will not be pushed to the LLC unless it gets evicted from an L2 cache (meaning it also would have been evicted from an L1 cache). The cacheline state in the LLC/L3 could also be (E)xclusive or (S)hared, but neither of these states can guarantee that a (M)odified copy of the cacheline is not in an L1 or L2 cache. As described above, the snooping operations are similar to those shown in FIG. 3, except the snoops originate from the LLC.

Depending on the configuration of the host processor and/or VMM or hypervisor, as well as potential other considerations, a given VM may be allocated to a single core (either physical or logical core) or multiple cores. Even in situations where a VM is allocated to a single core, there may be situations where the valid copy of a cacheline for a memory page in the VM MRU pool is currently located in the L1 or L2 cache of another core. Accordingly, in some configurations, the snooping operations of block 914 may snoop the L1 or L2 caches of multiple cores. The result of the snoop will be to retrieve the valid copy of the src2 cacheline and store a copy of it in tmp2.

In block 916, the bit values in tmp1 and tmp2 are XOR'ed to generate dst. If dst is non-zero, then the cacheline in tmp2 will be copied to the cacheline in the VM checkpoint page pointed to be scr1 in the same manner as described above. In a block 918, the dst value is then returned by the LLC engine to the core executing the instruction by sending dst in a message to that core. The core then returns dst (or zdst, if applicable) to the caller, as shown in a block 920.

Figure 10:
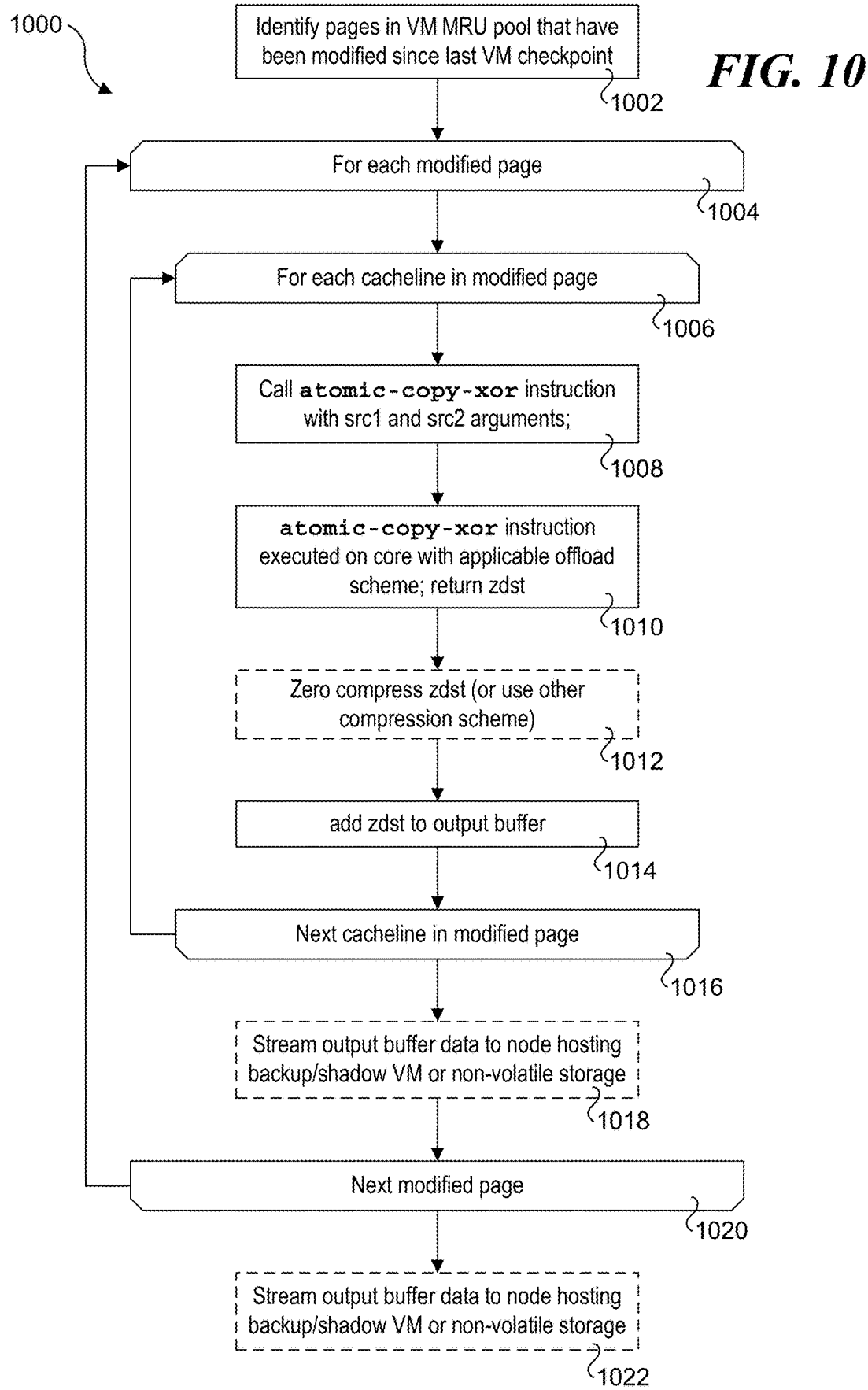
FIG. 10 shows a flowchart 1000 illustrating software loop operations performed during VM check-pointing operations, according to one embodiment.

FIG. 10 shows a flowchart 1000 illustrating software loop operations performed during VM check-pointing operations, according to one embodiment. In general, a portion of the operations and looping in FIG. 10 are a schematic depiction of the software loop shown in LISTING 2 above.

The process starts in a block 1002 in which pages in the VM MRU pool that have been modified since the last checkpoint are identified. As explained above in connection with FIGS. 4A-4E and 5A-5E, these pages may be identified in connection with keeping mapping information used to implement and track usage of the VM MRU pool. As depicted by outer loop blocks 1004 and 1020, the following operations (within these outer loop blocks) are performed for each modified page that is identified in block 1002. As further depicted by inner loop blocks 1006 and 1016, the operations in blocks 1008, 1010, 1012, and 1014 are performed for each cacheline within those pages.

In a block 1008, the inner software loop calls an atomic-copy-xor instruction with src1 and src2 arguments corresponding to the cachelines for the old age in the VM checkpoint pool and the modified by in the VM MRU pool, respectively. The use of the "atomic-copy-xor" instruction terminology in flowchart 1000 is in the generic sense, as the software may call one or more of the variants of the atomic-copy-xor instruction discussed herein, depending on the particular implementation. In a block 1010 the atomic-copy-xor instruction is executed on a core using an applicable offload scheme. For example, any of the offload schemes (offload to DIMM controller, offload to memory controller, offload to LLC engine) may be used. As yet another option, the core can execute the atomic-copy-xor instruction without using an offload scheme.

Execution of the atomic-copy-xor instruction in block 1010 will return zdst. In an optional block 1012 a zero compress operation may be performed on the zdst value, or some other compression scheme may be used. As discussed above, many of the zdst values will be all '0's (e.g., 512 '0's for unmodified cachelines or '00000000' on a Byte-wise basis for each unmodified Byte in a cacheline). For modified cachelines, the XOR result for one or more Bytes will be non-zero. In one embodiment a Byte bitmap is used to indicate whether the associate Byte is all '0's or non-zero, with 1 bit for each Byte. However, various types of compression schemes may be used, and as indicated, the use of a compression scheme is optional. Under one embodiment, the zdst value returned by the core is in a zero-compressed form.

In a block 1014, the zdst value (either compressed or not) is added to an output buffer, and the logic loops back to process the next cacheline for the page, with the operations of blocks 1008, 1010, 1012, and 1014 being repeated until all of the cachelines for the page are processed. As depicted in LISTING 2, in one embodiment the pages are 4 KB, partitioned into sixty-four 64-Byte cachelines.

Depending on the implementation, the output buffer data may be streamed to a destination node used to host the backup/shadow VM or to non-volatile storage as the pages are being processed, or following processing of all of the modified pages. These options are respectively shown in blocks 1018 and 1022. As an option to compressing zdst values in block 1014, compression may be applied in conjunction with streaming the output buffer data. For example, such compression may be applied as the output buffer data is being streamed or the output buffer data may be compressed in parallel with the operations of flowchart 1000.

In addition to being implemented in hardware logic using registers and XOR gates, embodiments of the atomic-copy-xor instructions may be implemented using microcode that is part of the processor's instruction set architecture (ISA). Under this approach, the logic depicted by the pseudocode in LISTING 1 is implemented via corresponding microcode instructions. As another alternative, the atomic-copy-xor instructions may be implemented via a combination of hardware logic and microcode.

The syntax of the atomic-copy-xor instructions disclosed and illustrated herein are exemplary and not to be limiting. As will be recognized by those having skill in the processor art, instructions that perform similar operations may have one or more of different names for the instruction, different names for the operands, different order of the operands, apply to different size cachelines, and additional operands.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Italicized letters, such as 'N' in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A processor comprising:
an instruction set architecture (ISA) including an atomic-copy-xor instruction having a first operand comprising an address of a first cacheline and a second operand comprising an address of a second cacheline, wherein execution of the atomic-copy-xor instruction causes the processor to:
perform a bitwise XOR operation on a copy of data retrieved from the first cacheline and a copy of data retrieved from the second cacheline to generate an XOR result;
detect whether the XOR result is non-zero;
when the XOR result is non-zero:
output the XOR result; and
replace data in the first cacheline with a copy of data from the second cacheline;
otherwise, when the XOR result is zero, output at least one of the XOR result and a flag indicating the XOR result is zero.

2. The processor of claim 1, wherein the processor includes:
a plurality of processor cores; and
a cache hierarchy, including a last level cache (LLC) having an associated LLC engine,
wherein the atomic-copy-xor instruction is executed on one of the processor cores and wherein the bitwise XOR operation is performed by the LLC engine.

3. The processor of claim 2, wherein execution of the atomic-copy-xor instruction by the one of the processor cores causes the processor to:
send a message including the addresses of the first and second cachelines to the LLC engine;
retrieve, via the LLC engine, a copy of the first cacheline and load corresponding data into a first register;
retrieve, via the LLC engine, a copy of the second cacheline and load corresponding data into a second register;
perform a bitwise XOR operation on the data in the first and second registers to produce the XOR result;
detect whether the XOR result is non-zero;
when the XOR result is non-zero:
send a message, which contains the XOR result, from the LLC engine to the one of the processor cores; and
copy the data in the second register into the first cacheline;
otherwise, when the XOR result is zero, send a message, which contains the XOR result, from the LLC engine to the one of the processor cores.

4. The processor of claim 3, wherein the LLC engine performs snooping operations to retrieve the copy of at least one of the first and second cachelines from a cacheline in a cache of the cache hierarchy.

5. The processor of claim 3, wherein the cache hierarchy includes a level 1 (L1) cache and a level 2 (L2) cache for each processor core and the LLC is an inclusive cache, wherein the processor includes a memory controller that is configured to be coupled to memory, wherein when the memory controller is coupled to memory and the atomic-copy-xor instruction is executed, the processor is further caused to:
retrieve a copy of the first cacheline from memory via the memory controller;
check the LLC and verify a valid copy of the second cacheline is not in the cache hierarchy; and
retrieve a copy of the second cacheline from memory via the memory controller.

6. The processor of claim 1, wherein the processor includes:
a plurality of processor cores; and
a memory controller, communicatively coupled to each of the plurality of processor cores,
wherein the atomic-copy-xor instruction is executed on one of the processor cores and wherein the bitwise XOR operation is performed by the memory controller.

7. The processor of claim 6, wherein the memory controller is configured to be connected to memory that is external to the processor, and wherein execution of the atomic-copy-xor instruction by the one of the processor cores when the memory controller is coupled to the memory causes the processor to:
send a message including the addresses of the first and second cachelines to the memory controller;
retrieve, via the memory controller, a copy of the first cacheline from the memory and load corresponding data into a first register;
retrieve, via the memory controller, a copy of the second cacheline from the memory and load corresponding data into a second register;
perform a bitwise XOR operation on the data in the first and second registers to produce the XOR result; and
send a message, which contains the XOR result, from the memory controller to the one of the processor cores.

8. The processor of claim 7, wherein execution of the atomic-copy-xor instruction further causes the memory controller to:
detect the XOR result is non-zero; and
copy the data in the second register into the first cacheline.

9. The processor of claim 1, wherein the atomic-copy-xor instruction is implemented in hardware circuitry including:
a first 64-bit register to store the first operand;
a second 64-bit register to store the second operand;
a first 64-byte register to store a copy of the first cacheline;
a second 64-byte register to store a copy of the second cacheline;
circuitry to effect bitwise XORing of data in the first and second 64-byte registers; and
a third 64-byte register to store a result of the bitwise XORing.

10. The processor of claim 1, wherein the ISA includes a plurality of microcode instructions, and wherein the atomic-copy-xor instruction is implemented, at least in part, via the use of microcode instructions from among the plurality of microcode instructions.

11. A system, comprising:
a processor including:
a plurality of processor cores;
a cache hierarchy, including a level 1 (L1) cache and a level 2 (L2) cache for each of the plurality of processor cores, and a last level cache (LLC), each of the L1 cache, L2 cache, and LLC configured to store data in a plurality of cachelines; and
a memory controller; and
system memory coupled to the memory controller, configured to store data in a plurality of memory pages, each memory page including a plurality of cachelines;
wherein the processor further has an instruction set architecture (ISA) including an atomic-copy-xor instruction having a first operand comprising an address of a first cacheline and a second operand comprising an address of a second cacheline, wherein execution of the atomic-copy-xor instruction on a processor core enables the processor to:

retrieve, using data associated with the first operand, a copy of data stored in the first cacheline;
retrieve, using data associated with the second operand, a copy of data stored in the second cacheline;
perform a bitwise XOR operation on the copy of data retrieved from the first cacheline and the copy of data retrieved from the second cacheline to generate an XOR result;
detect whether the XOR result is non-zero;
when the XOR result is non-zero:
    output the XOR result; and
    replace data in the first cacheline with a copy of data from the second cacheline;
otherwise, when the XOR result is zero, output the XOR result of zero or indicia indicating the XOR result is zero.

12. The system of claim 11, wherein the processor includes an LLC engine associated with the LLC, and wherein the bitwise XOR operation is performed by the LLC engine.

13. The system of claim 12, wherein execution of the atomic-copy-xor instruction by one of the processor cores enables the processor to:
send a message including the addresses of the first and second cachelines from the one of the processor cores to the LLC engine;
retrieve, via the LLC engine, a copy of the first cacheline and load corresponding data into a first register;
retrieve, via the LLC engine, a copy of the second cacheline and load corresponding data into a second register;
perform the bitwise XOR operation on the data in the first and second registers to produce the XOR result;
detect whether the XOR result is non-zero;
when the XOR result is non-zero:
    send a message, which contains the XOR result, from the LLC engine to the one of the processor cores; and
    copy the data in the second register into the first cacheline;
otherwise, when the XOR result is zero, send a message, which contains the XOR result or indicia indicating the XOR result is zero, from the LLC engine to the one of the processor cores.

14. The system of claim 13, wherein the LLC engine performs snooping operations to retrieve the copy of at least one of the first and second cachelines from a cacheline in a cache of the cache hierarchy.

15. The system of claim 13, wherein the LLC is an inclusive cache, and wherein execution of the atomic-copy-xor instruction further enables the processor to:
retrieve a copy of the first cacheline from memory via the memory controller;
check the LLC and verify a valid copy of the second cacheline is not in the cache hierarchy; and
retrieve a copy of the second cacheline from memory via the memory controller.

16. The system of claim 11, wherein the atomic-copy-xor instruction is executed on a processor cores among the plurality of processor cores and wherein the bitwise XOR operation and replacing data in the first cacheline with a copy of data from the second cacheline is offloaded to the memory controller.

17. The system of claim 16, wherein execution of the atomic-copy-xor instruction by the processor core among the plurality of processor cores further enables the processor to:
send a message including the addresses of the first and second cachelines to the memory controller;
retrieve, via the memory controller, a copy of the first cacheline from the memory and load corresponding data into a first register in the memory controller;
retrieve, via the memory controller, a copy of the second cacheline from the memory and load corresponding data into a second register in the memory controller;
perform a bitwise XOR operation on the data in the first and second registers to produce the XOR result; and
send a message, which contains the XOR result, from the memory controller to the processor core among the plurality of processor cores.

18. The system of claim 17, wherein execution of the atomic-copy-xor instruction further enables the memory controller to:
detect the XOR result is non-zero; and, in response thereto,
copy the data in the second register into the first cacheline.

19. A computer-implemented method performed by a compute platform including a processor having a plurality of cores and a cache hierarchy comprising a plurality of caches in which data is stored in cachelines, the processor further including a memory controller coupled to system memory configured to store data in a plurality of memory pages, each memory page including a plurality of cachelines, the method comprising:
executing a first atomic-copy-xor instruction on a core of the plurality of cores, the first atomic-copy-xor instruction received from a caller including a first operand comprising an address of a first cacheline and a second operand comprising an address of a second cacheline, wherein execution of the atomic-copy-xor instruction causes the processor to:
    retrieve, using the address of the first cacheline, a copy of data stored in the first cacheline;
    retrieve, using the address of the second cacheline, a copy of data stored in the second cacheline;
    perform a bitwise XOR operation on the copy of data retrieved from the first cacheline and the copy of data retrieved from the second cacheline to generate a non-zero XOR result;
    replace data in the first cacheline with a copy of data from the second cacheline; and
    return the non-zero XOR result to the caller of the first atomic-copy-xor instruction.

20. The computer-implemented method of claim 19, wherein the cache hierarchy includes a level 1 (L1) cache and a level 2 (L2) cache for each of the plurality of cores, and a last level cache (LLC) associated with an LLC engine, and wherein during execution of the first atomic-copy-xor instruction, the operations of retrieving the copies of the first and second cachelines, performing the bitwise XOR operation, and replacing the data in the first cacheline with the copy of data from the second cacheline are offloaded from the core of the plurality of cores to be performed by the LLC engine.

21. The computer-implemented method of claim 20, wherein execution of the first atomic-copy-xor instruction on the core of the plurality of cores further causes the processor to:
send a message including the addresses of the first and second cachelines from the core of the plurality of cores to the LLC engine;
retrieve, via the LLC engine, a copy of the first cacheline and load corresponding data into a first register;

retrieve, via the LLC engine, a copy of the second cacheline and load corresponding data into a second register;

perform the bitwise XOR operation on the data in the first and second registers to produce the XOR result;

copy, via the LLC engine, the data in the second register into the first cacheline; and send a message, which contains the XOR result produced by the bitwise XOR operation, from the LLC engine to the core of the plurality of cores.

22. The computer-implemented method of claim 21, wherein each of the L1 and L2 caches includes an associated cache agent, wherein the address of the second cacheline corresponds to an address of a cacheline in system memory, and wherein the LLC engine sends snoop messages to one or more cache agents to snoop for a modified copy of the second cacheline in one of the L1 or L2 caches and retrieve the modified copy of the second cacheline from an L1 or L2 cache for which a snoop message results in a hit.

23. The computer-implemented method of claim 21, wherein the LLC is an inclusive cache, and wherein the LLC engine:

retrieves a copy of the first cacheline from the system memory via the memory controller;

checks the LLC to verify a copy of the second cacheline is not in the cache hierarchy; and retrieves a copy of the second cacheline from the system memory via the memory controller.

24. The computer-implemented method of claim 19, wherein during the execution of the first atomic-copy-xor instruction, the operations of retrieving the copies of data stored in the first and second cachelines, performing the bitwise XOR operation, and replacing the data in the first cacheline with the copy of data from the second cacheline are offloaded from the core of the processor cores to be performed by the memory controller.

25. The computer-implemented method of claim 24, wherein execution of the first atomic-copy-xor instruction on the core of the plurality of cores further causes the processor to:

send a message including the addresses of the first and second cachelines from the core of the plurality of cores to the memory controller;

retrieve, via the memory controller, a copy of the first cacheline from the system memory and load corresponding data into a first register in the memory controller;

retrieve, via the memory controller, a copy of the second cacheline from the system memory and load corresponding data into a second register in the memory controller;

perform a bitwise XOR operation on the data in the first and second registers to produce the XOR result;

send a message, which contains the XOR result, from the memory controller to the core of the processor cores; and detect the XOR result is non-zero; and, in response thereto, copy the data in the second register into the first cacheline in system memory.

26. The computer-implemented method of claim 19, further comprising:

executing a second atomic-copy-xor instruction on the core of the plurality of cores, the second atomic-copy-xor instruction received from the caller and including a first operand comprising an address of a third cacheline and a second operand comprising an address of a fourth cacheline, wherein execution of the second atomic-copy-xor instruction causes the processor to:

retrieve, using the address of the third cacheline, a copy of data stored in the third cacheline;

retrieve, using the address of the fourth cacheline, a copy of data stored in the fourth cacheline;

perform a bitwise XOR operation on the copy of data retrieved from the third cacheline and the copy of data retrieved from the fourth cacheline resulting in an XOR result of zero; and returning the XOR result of zero or indicia indicating the XOR result of zero is zero to the caller.

27. A processor comprising:

a plurality of processor cores; and a memory controller, communicatively coupled to each of the plurality of processor cores, wherein, the processor is configured to be installed in a system including a Dual in-line Memory Module (DIMM) including memory and a DIMM controller coupled to the memory controller when the processor is installed in the system, and wherein the processor includes an instruction set architecture (ISA) including an atomic-copy-xor instruction having a first operand comprising an address of a first cacheline and a second operand comprising an address of a second cacheline, wherein execution of the atomic-copy-xor instruction causes the processor to:

send a given instruction to the memory controller including the addresses of the first and second cachelines and information indicating the DIMM controller is to perform a copy-XOR operation on the first and second cachelines;

instruct, via the memory controller or by forwarding the given instruction from the memory controller to the DIMM controller, the DIMM controller to perform the copy-XOR operation on the first and second cachelines under which the DIMM controller is to perform a bitwise XOR operation on data from the first and second cachelines, and return an XOR result of the bitwise XOR operation to the memory controller; and send a message, which contains the XOR result, from the memory controller to a processor core of the plurality of processor cores containing the XOR result, wherein the DIMM controller, in response to being instructed by the memory controller or receiving an instruction forwarded by the memory controller, further is instructed to detect whether the XOR result is non-zero, and, in response to detecting the XOR result is non-zero, copy data from the second cacheline into the first cacheline.

28. The processor of claim 27, wherein the processor is configured to support more than one type of atomic-copy-xor instruction, and wherein the atomic-copy-xor instruction contains indicia indicating the copy-XOR operation is to be offloaded to the DIMM controller.

29. The processor of claim 27, wherein the execution of the atomic-copy-xor instruction causes the processor to opportunistically send the given instruction to the memory controller.

* * * * *